United States Patent
Park et al.

(10) Patent No.: US 11,887,231 B2
(45) Date of Patent: Jan. 30, 2024

(54) AVATAR ANIMATION SYSTEM

(71) Applicant: Tahoe Research, Ltd., Dublin (IE)

(72) Inventors: Minje Park, Seoul (KR); Tae-Hoon Kim, Seoul (KR); Myung-Ho Ju, Seoul (KR); Jihyeon Yi, Yongin-si (KR); Xiaolu Shen, Beijing (CN); Lidan Zhang, Beijing (CN); Qiang Li, Beijing (CN)

(73) Assignee: Tahoe Research, Ltd., Dublin (IE)

( * ) Notice: Subject to any disclaimer, the term of this patent is extended or adjusted under 35 U.S.C. 154(b) by 0 days.

(21) Appl. No.: 16/655,686

(22) Filed: Oct. 17, 2019

(65) Prior Publication Data
US 2020/0051306 A1 Feb. 13, 2020

Related U.S. Application Data

(63) Continuation of application No. 15/124,811, filed as application No. PCT/CN2015/097826 on Dec. 18, 2015, now Pat. No. 10,475,225.

(51) Int. Cl.
| | | |
|---|---|---|
| G06T 13/40 | (2011.01) | |
| G06T 7/73 | (2017.01) | |
| G06T 17/20 | (2006.01) | |

(52) U.S. Cl.
CPC ............... *G06T 13/40* (2013.01); *G06T 7/73* (2017.01); *G06T 17/20* (2013.01);
(Continued)

(58) Field of Classification Search
CPC ....... G06T 13/40; G06T 7/73; G06T 2210/44; G06T 17/20; G06T 2207/20084; G06T 2207/30201
See application file for complete search history.

(56) References Cited

U.S. PATENT DOCUMENTS

| | | |
|---|---|---|
| 4,149,930 A | 4/1979 | Exner et al. |
| 5,880,731 A | 3/1999 | Liles et al. |

(Continued)

FOREIGN PATENT DOCUMENTS

| | | |
|---|---|---|
| CN | 1532775 | 9/2004 |
| CN | 1732687 | 2/2006 |

(Continued)

OTHER PUBLICATIONS

PCT Search Report and Written Opinion for PCT Application No. PCT/CN2015/097826, dated Sep. 22, 2016, 12 pgs.
(Continued)

*Primary Examiner* — Sing-Wai Wu
*Assistant Examiner* — Khoa Vu
(74) *Attorney, Agent, or Firm* — Studebaker & Brackett PC

(57) ABSTRACT

Avatar animation systems disclosed herein provide high quality, real-time avatar animation that is based on the varying countenance of a human face. In some example embodiments, the real-time provision of high quality avatar animation is enabled, at least in part, by a multi-frame regressor that is configured to map information descriptive of facial expressions depicted in two or more images to information descriptive of a single avatar blend shape. The two or more images may be temporally sequential images. This multi-frame regressor implements a machine learning component that generates the high quality avatar animation from information descriptive of a subject's face and/or information descriptive of avatar animation frames previously generated by the multi-frame regressor. The machine learning component may be trained using a set of training images that depict human facial expressions and avatar animation authored by professional animators to reflect facial expressions depicted in the set of training images.

19 Claims, 6 Drawing Sheets

(52) U.S. Cl.
CPC ............ *G06T 2207/20084* (2013.01); *G06T 2207/30201* (2013.01); *G06T 2210/44* (2013.01)

(56) References Cited

U.S. PATENT DOCUMENTS

| | | | |
|---|---|---|---|
| 5,953,700 | A | 9/1999 | Kanevsky et al. |
| 6,072,496 | A | 6/2000 | Guenter et al. |
| 6,307,576 | B1 | 10/2001 | Rosenfeld |
| 6,313,864 | B1 | 11/2001 | Tabata et al. |
| 6,477,239 | B1 | 11/2002 | Ohki et al. |
| 6,545,682 | B1 | 4/2003 | Ventrella et al. |
| 6,580,811 | B2 | 6/2003 | Maurer et al. |
| 6,611,278 | B2 | 8/2003 | Rosenfeld |
| 7,003,501 | B2 | 2/2006 | Ostroff |
| 7,076,118 | B1 | 7/2006 | Westerman |
| 7,116,330 | B2 | 10/2006 | Marshall et al. |
| 7,176,956 | B2 | 2/2007 | Rzeszewski et al. |
| 7,237,717 | B1 | 7/2007 | Rao et al. |
| 7,386,799 | B1 | 6/2008 | Clanton et al. |
| 7,447,211 | B1 | 11/2008 | Scholte |
| 7,564,476 | B1 | 7/2009 | Coughlan et al. |
| 7,716,133 | B1 | 5/2010 | Foote et al. |
| 7,752,270 | B2 | 7/2010 | Durand et al. |
| 7,883,415 | B2 | 2/2011 | Larsen et al. |
| 8,111,281 | B2 | 2/2012 | Sangberg et al. |
| 8,260,262 | B2 | 9/2012 | Ben Ayed |
| 8,581,911 | B2 | 11/2013 | Becker |
| 8,758,132 | B2 | 6/2014 | Marks et al. |
| 8,840,470 | B2 | 9/2014 | Zalewski et al. |
| 8,848,068 | B2 | 9/2014 | Pfister |
| 8,988,436 | B2 | 3/2015 | Becker |
| 9,104,908 | B1 | 8/2015 | Rogers |
| 9,111,134 | B1 | 8/2015 | Rogers |
| 9,134,816 | B2 | 9/2015 | Dahlkvist |
| 9,300,901 | B2 | 3/2016 | Grundhofer |
| 9,330,483 | B2 | 5/2016 | Du et al. |
| 9,357,174 | B2 | 5/2016 | Li et al. |
| 9,361,723 | B2 | 6/2016 | Zhou |
| 9,386,268 | B2 | 7/2016 | Tong et al. |
| 9,398,262 | B2 | 7/2016 | Li et al. |
| 9,489,760 | B2 | 11/2016 | Li et al. |
| 9,589,357 | B2 | 3/2017 | Li et al. |
| 9,626,788 | B2 | 4/2017 | Corazza |
| 9,747,695 | B2 | 8/2017 | Lucy |
| 9,799,096 | B1* | 10/2017 | De la Torre .......... A63F 13/655 |
| 9,799,133 | B2 | 10/2017 | Tong et al. |
| 9,824,502 | B2 | 11/2017 | Tong et al. |
| 9,830,728 | B2 | 11/2017 | Fang et al. |
| 10,176,619 | B2 | 1/2019 | Jiao et al. |
| 10,475,225 | B2 | 11/2019 | Park et al. |
| 10,540,800 | B2 | 1/2020 | Tong et al. |
| 10,776,980 | B2 | 9/2020 | Jiao et al. |
| 10,740,944 | B2 | 11/2020 | Fang et al. |
| 2002/0029258 | A1 | 3/2002 | Mousseau et al. |
| 2002/0197967 | A1 | 6/2002 | Scholl et al. |
| 2003/0142236 | A1 | 7/2003 | Aratani et al. |
| 2003/0182122 | A1 | 9/2003 | Horinaka et al. |
| 2003/0206171 | A1 | 11/2003 | Kim et al. |
| 2003/0225846 | A1 | 12/2003 | Heikes et al. |
| 2004/0130614 | A1 | 7/2004 | Valliath et al. |
| 2004/0179037 | A1 | 9/2004 | Blattner et al. |
| 2004/0201666 | A1 | 10/2004 | Matsuo et al. |
| 2005/0162419 | A1 | 7/2005 | Kim et al. |
| 2005/0271252 | A1 | 12/2005 | Yamada |
| 2006/0023923 | A1 | 2/2006 | Geng et al. |
| 2006/0079325 | A1 | 4/2006 | Trajkovic et al. |
| 2006/0294465 | A1 | 12/2006 | Ronnen et al. |
| 2007/0019855 | A1 | 1/2007 | Marlett et al. |
| 2007/0019885 | A1 | 1/2007 | Chatting et al. |
| 2007/0065039 | A1 | 3/2007 | Park et al. |
| 2007/0201730 | A1 | 8/2007 | Masaki et al. |
| 2007/0230794 | A1 | 10/2007 | McAlpine et al. |
| 2007/0263075 | A1 | 11/2007 | Nimri et al. |
| 2007/0295382 | A1 | 12/2007 | Oak |
| 2008/0059570 | A1 | 3/2008 | Bill |
| 2008/0136814 | A1 | 6/2008 | Chu et al. |
| 2008/0170777 | A1 | 7/2008 | Sullivan et al. |
| 2008/0214168 | A1 | 9/2008 | Bailey et al. |
| 2008/0267459 | A1 | 10/2008 | Nakada et al. |
| 2009/0002479 | A1 | 1/2009 | Sangberg et al. |
| 2009/0055484 | A1 | 2/2009 | Vuong et al. |
| 2009/0066700 | A1* | 3/2009 | Harding ................ G06T 7/251 345/473 |
| 2009/0128579 | A1 | 5/2009 | Xie |
| 2009/0158160 | A1 | 6/2009 | Alberth, Jr. et al. |
| 2009/0232409 | A1 | 9/2009 | Marchesotti |
| 2009/0300513 | A1 | 12/2009 | Nims et al. |
| 2009/0315893 | A1 | 12/2009 | Smith et al. |
| 2010/0018382 | A1 | 1/2010 | Feeney et al. |
| 2010/0070858 | A1 | 3/2010 | Morris et al. |
| 2010/0071008 | A1 | 3/2010 | Hu |
| 2010/0082345 | A1 | 4/2010 | Wang et al. |
| 2010/0141663 | A1 | 6/2010 | Becker et al. |
| 2010/0146052 | A1 | 6/2010 | Pare et al. |
| 2010/0156781 | A1 | 6/2010 | Fahn |
| 2010/0189354 | A1 | 7/2010 | de Campos et al. |
| 2010/0203968 | A1* | 8/2010 | Gill ....................... H04L 67/131 463/32 |
| 2010/0211397 | A1 | 8/2010 | Park et al. |
| 2010/0220897 | A1 | 9/2010 | Ueno et al. |
| 2010/0281432 | A1 | 11/2010 | Geisner et al. |
| 2010/0302252 | A1 | 12/2010 | Petrovic et al. |
| 2011/0007079 | A1 | 1/2011 | Perez et al. |
| 2011/0007142 | A1 | 1/2011 | Perez et al. |
| 2011/0007174 | A1 | 1/2011 | Bacivarov et al. |
| 2011/0025689 | A1 | 2/2011 | Perez |
| 2011/0064388 | A1 | 3/2011 | Brown et al. |
| 2011/0085139 | A1 | 4/2011 | Blixt et al. |
| 2011/0162082 | A1 | 6/2011 | Paksoy et al. |
| 2011/0252144 | A1 | 10/2011 | Tung et al. |
| 2011/0292051 | A1 | 12/2011 | Nelson et al. |
| 2011/0296324 | A1 | 12/2011 | Goossens et al. |
| 2011/0304629 | A1 | 12/2011 | Winchester |
| 2011/0307837 | A1 | 12/2011 | Cohen et al. |
| 2012/0058747 | A1 | 3/2012 | Yiannios et al. |
| 2012/0075463 | A1 | 3/2012 | Chen et al. |
| 2012/0079377 | A1 | 3/2012 | Goossens |
| 2012/0079378 | A1 | 3/2012 | Goossens |
| 2012/0115584 | A1 | 5/2012 | Nguyen et al. |
| 2012/0130717 | A1 | 5/2012 | Xu |
| 2012/0139830 | A1 | 6/2012 | Hwang et al. |
| 2012/0139899 | A1 | 6/2012 | Winchester |
| 2012/0206558 | A1 | 8/2012 | Setton |
| 2013/0002669 | A1 | 1/2013 | Rhee |
| 2013/0004028 | A1 | 1/2013 | Jones et al. |
| 2013/0013089 | A1 | 1/2013 | Kawakami et al. |
| 2013/0019154 | A1 | 1/2013 | Wolfston, Jr. et al. |
| 2013/0038601 | A1 | 2/2013 | Han et al. |
| 2013/0096916 | A1 | 4/2013 | Pemmaraju |
| 2013/0109302 | A1 | 5/2013 | Levien et al. |
| 2013/0120522 | A1 | 5/2013 | Lian et al. |
| 2013/0132091 | A1 | 5/2013 | Skerpac |
| 2013/0147788 | A1 | 6/2013 | Weise et al. |
| 2013/0147845 | A1 | 6/2013 | Xie et al. |
| 2013/0217364 | A1 | 8/2013 | Varoglu et al. |
| 2013/0219166 | A1 | 8/2013 | Ristov et al. |
| 2013/0232578 | A1 | 9/2013 | Chevallier-Mames et al. |
| 2013/0235045 | A1 | 9/2013 | Corazza et al. |
| 2013/0286161 | A1 | 10/2013 | Lv et al. |
| 2013/0293584 | A1 | 11/2013 | Anderson |
| 2014/0026102 | A1 | 1/2014 | Kinn |
| 2014/0035929 | A1* | 2/2014 | Matthews ................ G06T 17/20 345/473 |
| 2014/0035934 | A1 | 2/2014 | Du et al. |
| 2014/0043329 | A1* | 2/2014 | Wang .................. G06K 9/00201 345/420 |
| 2014/0055554 | A1 | 2/2014 | Du et al. |
| 2014/0085293 | A1 | 3/2014 | Konoplev et al. |
| 2014/0093083 | A1 | 4/2014 | Dadu et al. |
| 2014/0152758 | A1 | 6/2014 | Tong et al. |
| 2014/0153832 | A1 | 6/2014 | Kawatra et al. |
| 2014/0154659 | A1 | 6/2014 | Otwell |
| 2014/0162612 | A1 | 6/2014 | Ma |

(56) References Cited

U.S. PATENT DOCUMENTS

| | | | |
|---|---|---|---|
| 2014/0176662 A1 | 6/2014 | Goodman et al. | |
| 2014/0181229 A1 | 6/2014 | Tucker et al. | |
| 2014/0198121 A1 | 7/2014 | Tong et al. | |
| 2014/0218371 A1 | 8/2014 | Du | |
| 2014/0218459 A1 | 8/2014 | Wenlong et al. | |
| 2014/0267413 A1 | 9/2014 | Du | |
| 2014/0355861 A1 | 12/2014 | Nirenberg | |
| 2014/0362091 A1* | 12/2014 | Bouaziz | G06T 15/503 345/473 |
| 2015/0084950 A1 | 3/2015 | Li | |
| 2015/0286858 A1 | 10/2015 | Shaburov et al. | |
| 2015/0310263 A1* | 10/2015 | Zhang | G02B 27/0093 382/103 |
| 2015/0312523 A1 | 10/2015 | Li et al. | |
| 2015/0332088 A1 | 11/2015 | Chembula | |
| 2015/0381939 A1 | 12/2015 | Cunico et al. | |
| 2016/0027200 A1 | 1/2016 | Corazza | |
| 2016/0163084 A1* | 6/2016 | Corazza | G06T 13/40 345/419 |
| 2016/0180568 A1 | 6/2016 | Bullivant | |
| 2016/0203827 A1 | 7/2016 | Leff et al. | |
| 2016/0328875 A1 | 11/2016 | Fang et al. | |
| 2016/0328876 A1 | 11/2016 | Tong et al. | |
| 2016/0328886 A1 | 11/2016 | Tong et al. | |
| 2016/0364895 A1 | 12/2016 | Santossio et al. | |
| 2017/0039751 A1 | 2/2017 | Tong et al. | |
| 2017/0054945 A1 | 2/2017 | Li et al. | |
| 2017/0111614 A1 | 4/2017 | Tong et al. | |
| 2017/0111615 A1 | 4/2017 | Li et al. | |
| 2017/0111616 A1 | 4/2017 | Li et al. | |
| 2017/0118145 A1 | 4/2017 | Aittoniemi et al. | |
| 2017/0132828 A1* | 5/2017 | Zelenin | A63F 13/45 |
| 2017/0256086 A1 | 9/2017 | Park et al. | |
| 2017/0301125 A1* | 10/2017 | Bouaziz | G06T 7/292 |
| 2017/0310934 A1 | 10/2017 | Du et al. | |
| 2018/0025506 A1 | 1/2018 | Li et al. | |
| 2018/0300925 A1 | 10/2018 | Fang et al. | |
| 2019/0320144 A1 | 10/2019 | Tong et al. | |
| 2020/0051306 A1 | 2/2020 | Park et al. | |
| 2021/0056746 A1 | 2/2021 | Fang et al. | |
| 2021/0105438 A1 | 4/2021 | Tong et al. | |

FOREIGN PATENT DOCUMENTS

| | | |
|---|---|---|
| CN | 1762145 | 4/2006 |
| CN | 1832604 | 9/2006 |
| CN | 1920886 | 2/2007 |
| CN | 1972274 | 5/2007 |
| CN | 101035242 | 9/2007 |
| CN | 101098241 | 1/2008 |
| CN | 101110937 | 1/2008 |
| CN | 201000895 | 1/2008 |
| CN | 101149840 | 3/2008 |
| CN | 101217511 | 7/2008 |
| CN | 100413362 | 8/2008 |
| CN | 101354795 | 1/2009 |
| CN | 101378237 | 3/2009 |
| CN | 201226500 | 4/2009 |
| CN | 101472158 | 7/2009 |
| CN | 101499128 | 8/2009 |
| CN | 101669328 | 3/2010 |
| CN | 101677389 | 3/2010 |
| CN | 101690071 | 3/2010 |
| CN | 101826217 | 9/2010 |
| CN | 101924924 | 12/2010 |
| CN | 101981538 | 2/2011 |
| CN | 102046249 | 5/2011 |
| CN | 102087750 | 6/2011 |
| CN | 102157007 | 8/2011 |
| CN | 102158816 | 8/2011 |
| CN | 102176197 | 9/2011 |
| CN | 102214288 | 10/2011 |
| CN | 102254336 | 11/2011 |
| CN | 102271241 | 12/2011 |
| CN | 102413886 | 4/2012 |
| CN | 1009333 | 6/2012 |
| CN | 102509333 | 6/2012 |
| CN | 102934144 | 2/2013 |
| CN | 103093490 | 5/2013 |
| CN | 103593650 | 2/2014 |
| CN | 103942822 A | 7/2014 |
| CN | 104011738 | 8/2014 |
| CN | 104205171 | 12/2014 |
| CN | 107209953 | 9/2017 |
| EP | 2431936 | 3/2012 |
| FR | 2924864 | 6/2009 |
| JP | 2003046109 | 2/2003 |
| JP | 2003244425 | 8/2003 |
| JP | 2005018305 | 1/2005 |
| JP | 2005173772 | 6/2005 |
| JP | H09311945 | 12/2006 |
| JP | 2007220004 | 8/2007 |
| JP | 20090199417 | 9/2009 |
| JP | 2012022403 | 2/2012 |
| JP | 2013206135 | 1/2015 |
| KR | 1020050031020 | 4/2005 |
| TW | M290286 | 5/2006 |
| TW | 200841736 | 10/2008 |
| TW | 200945074 | 11/2009 |
| TW | 201136372 | 10/2011 |
| TW | 201205122 | 2/2012 |
| TW | 201303747 | 1/2013 |
| TW | 201352003 | 12/2013 |
| TW | I526947 | 3/2016 |
| WO | 0209040 | 1/2002 |
| WO | 2009122007 | 10/2009 |
| WO | 2009128784 | 10/2009 |
| WO | 2010128830 | 11/2010 |
| WO | 2011127309 | 10/2011 |
| WO | 2012139276 | 10/2012 |
| WO | 2013074153 | 5/2013 |
| WO | 2013097139 | 7/2013 |
| WO | 2013097264 | 7/2013 |
| WO | 2013152453 | 10/2013 |
| WO | 2013152454 | 10/2013 |
| WO | 2013152455 | 10/2013 |
| WO | 2014036708 | 3/2014 |
| WO | 2014094199 | 6/2014 |
| WO | 2014194439 | 12/2014 |
| WO | 2016101124 | 6/2016 |
| WO | 2016101131 | 6/2016 |
| WO | 2016101132 | 6/2016 |

OTHER PUBLICATIONS

<http://msdn.microsoft.com/en-us/library/dn782034.aspx> "Face Tracking", Oct. 8, 2019, 3pgs.

Dragos Stanculescu, FaceRig Guide v1.0, Jul. 7, 2015, 35pgs.

Intel Realsense SDK2015R4 Developer Guide V6.0; 86pgs, 2010-2015.

Jue Wang et al., "The Cartoon Animation Filter", AMC Transactions of Graphics (Proceedings of SIGGRAPH 2006), Jul. 2006, 5pgs.

United States Patent and Trademark Office, "Non-Final Office Action," issued in connection with U.S. Appl. No. 15/124,811, dated Dec. 5, 2017, 14 pages.

United States Patent and Trademark Office, "Final Office Action," issued in connection with U.S. Appl. No. 15/124,811, dated May 2, 2018, 14 pages.

United States Patent and Trademark Office, "Non-Final Office Action," issued in connection with U.S. Appl. No. 15/124,811, dated Aug. 16, 2018, 15 pages.

United States Patent and Trademark Office, "Final Office Action," issued in connection with U.S. Appl. No. 15/124,811, dated Dec. 13, 2018, 16 pages.

United States Patent and Trademark Office, "Notice of Allowance," issued in connection with U.S. Appl. No. 15/124,811, dated Jul. 2, 2019, 12 pages.

The International Bureau, "International Preliminary Report on Patentability," issued in connection with application No. PCT/CN2015/097826, dated Jun. 19, 2018, 5 pages.

(56) References Cited

OTHER PUBLICATIONS

Thomas et al., "The Illusion of Life Disney Animation," Disney Publishing Worldwide, Oct. 19, 1995, 3 pages (Book, abstract only provided).
Wikipedia, "Twelve Basic Principles of Animation," https://en.wikipedia.org/wiki/Twelve_basic_principles_of_animation, last edited on Jan. 13, 2021, retrieved on Feb. 12, 2021, 8 pages.
United States Patent and Trademark Office, "Non-Final Office Action," issued in connection with U.S. Appl. No. 15/395,661 dated Apr. 13, 2018, 10 pages.
International Searching Authority, "International Search Report and Written Opinion," issued in connection with Application No. PCT/CN201387127, dated Mar. 27, 2014, 7 pages.
The International Bureau, "International Preliminary Report on Patentability," issued in connection with application No. PCT/CN2013087127, dated May 17, 2016, 5 pages.
United States Patent and Trademark Office, "Non-Final Office Action," issued in connection with U.S. Appl. No. 14/358,394, dated Feb. 25, 2016, 13 pages.
United States Patent and Trademark Office, "Notice of Allowance," issued in connection with U.S. Appl. No. 14/358,394, dated Jul. 1, 2016, 10 pages.
National Intellectual Property Administration, P.R. China, "First Office Action," issued in connection with Application No. 201710032311, dated Jul. 30, 2019, 29 pages.
Search Report of R.O.C, "Taiwan Search Report," in connection with Application No. 107137526, completed on Aug. 6, 2019, 3 pages.
United States Patent and Trademark Office, "Final Office Action," issued in connection with U.S. Appl. No. 16/453,507, dated May 1, 2020, 14 pages.
United States Patent and Trademark Office, "Non-Final Office Action," issued in connection with U.S. Appl. No. 16/453,507, dated Sep. 26, 2019, 13 pages.
United States Patent and Trademark Office, "Notice of Allowance," issued in connection with U.S. Appl. No. 13/996,009, dated Mar. 14, 2016, 17 pages.
"Digital rights management," Wikipedia, The Free Encyclopedia, retrieved from: <"https://en.wikipedia.org/w/index.php?title=Digital_rights_management&oldid=1021194441">, edited May 3, 2021, 32 pages.
"Multi-factor authentication," Wikipedia, The Free Encyclopedia, retrieved from: <"https://en.wikipedia.org/w/index.php?title=Multi-factor_authentication&oldid=476406166">, edited May 10, 2021, 3 pages.
"Speaker recognition," Wikipedia, The Free Encyclopedia, retrieved from: <"https://en.wikipedia.org/w/index.php?title=Speaker_recognition&oldid=1020702049">, edited Apr. 30. 2021, 6 pages.
"Speech recognition," Wikipedia, The Free Encyclopedia, retrieved from: <"https://en.wikipedia.org/w/index.php?title=Speech_recognition&oldid=1021739807">, edited May 6, 2021, 28 pages.
"Evaluation of Face Recognition Algorithms", http://www.cs.colostate.edu/evalfacerec/index10.php, Colorado State University, Fort Collins, CO, 2010. Retrieved Dec. 22, 2011, 1 Page.
International Searching Authority, "International Search Report and Written Opinion," issued in connection with application No. PCT/CN2012/000461, dated Oct. 4, 2012, 8 Pages.
International Searching Authority, "International Search Report and Written Opinion," issued in connection with application No. PCT/CN2012/084902, dated Feb. 7, 2013, 14 Pages.
International Searching Authority, "International Search Report and Written Opinion," issued in connection with application No. PCT/CN2012/000458, dated Jan. 24, 2013, 11 Pages.
International Search Report and Written Opinion received for PCT Patent Application No. PCT/CN2012/000459, dated Jan. 17, 2013, 11 Pages.
International Searching Authority, "International Search Report and Written Opinion," issued in connection with PCT Patent Application No. PCT/CN2012/000460, dated Dec. 20, 2012, 9 pages.
International Searching Authority, "International Search Report and Written Opinion," issued in connection with application No. PCT/CN2011/072603, dated Oct. 27, 2011, 11 Pages.
3D Face Modeller: 3D Face Generator, downloaded from www.facegen.com/modeller, 2021, 4 Pages.
3D PhotoFace, downloaded from www.oddcase.com/technologies/photoface, 1 Page.
"ITU Gaze Tracker", downloaded from www.gazegroup.org/downloads/23-gazetracker, 4 pages.
"Opengazer: open-sourse gaze tracker for ordinary webcams", downloaded from www.inference.phy,cam.ac.uk/opengazer, 7 Pages.
"Introducting Tobii Technology", downloaded from www.tobii.com, 2 pages.
"Gazelib", downloaded from code.google.com/p/gazelib, 1 Page.
Viola, et al., "Rapid Object Detection using a Boosted Cascade of Simple Featuers", Accepted Conference on Computer Vision and Pattern Recognition 2001, 9 pages.
Beveridge et al., The CSU Face Identification Evaluation System; Its purpose, features and structure, Colorado State University, Aug. 20, 2004, 11 pages.
Visual Avatar Chat—Free Chat Server, downloaded from http://visualchat.weirdoz.org, 2 pages.
Chinese Patent Office, "Decision of Reexamination," issued in connection with Chinese Application No. 201710032311.X, dated Sep. 9, 2021, 39 pages.
WeChat—The New Way to Connect, retrieved from http://www.wechat.com/en/, retrieved on Apr. 4, 2013, pp. 1-2 as printed.
United States Patent and Trademark Office, "Final Office Action," issued in connection with U.S. Appl. No. 13/996,009, dated Oct. 23, 2015, 10 pages.
United States Patent and Trademark Office, "Non-Final Office Action," issued in connection with U.S. Appl. No. 13/996,009, dated Apr. 24, 2015, 15 pages.
United States Patent and Trademark Office, "Notice of Allowance," issued in connection with U.S. Appl. No. 13/996,009, dated Mar. 14, 2016, 15 pages.
United States Patent and Trademark Office, "Final Office Action," issued in connection with U.S. Appl. No. 15/395,580, dated Dec. 26, 2018, 14 pages.
United States Patent and Trademark Office, "Non-Final Office Action," issued in connection with U.S. Appl. No. 15/395,580, dated Jun. 26, 2018, 17 pages.
Chinese Patent Office, "Notice of Allowance," issued in connection with application No. 106103276, dated Sep. 19, 2018, 3 pages.
United States Patent and Trademark Office, "Non-Final Office Action," issued in connection with U.S. Appl. No. 15/395,657, dated Feb. 23, 2017, 11 pages.
United States Patent and Trademark Office, "Non-Final Office Action," issued in connection with U.S. Appl. No. 15/395,661, dated May 11, 2017, 16 pages.
Chinese Patent Office, "Office Action and Search Report," issued in connection with Chinese Application No. 201280071927.3, dated Oct. 9, 2016, with English translation, 23 pages.
Reallusion, "Create Your Own Talking Avatars—Crazy Talk Avatar Creator," Crazy Talk Avatar, downloaded from http:www.reallusion.com/crazytalklavatar.html, Mar. 13, 2017, 10 pages.
"CrazyTalk 7.3 Tutorial—Custom Motion Clip Strength," , Crazy Talk Presentation YouTube Video, downloaded from https:1/www.youtube.com/watch?v=VXRjX5bNGKA, Mar. 13, 2017, 3 pages.
Reallusion, "Crazy Talk Animator 3—Create Animated Videos and Presentations," Crazy Talk Presentation Information, downloaded from http://www.reallusion.com/crazytalkpresentation/default.aspx, Mar. 14, 2017, 8 pages.
Crazy Talk Online Manual, downloaded from http://manual.reallusion.com/CrazyTalk_8/ENU/Default.htm, Apr. 11, 2017, 1 page.
Facerig, downloaded from https://facerig.com/, Mar. 2, 2017, 6 pages.
FaceRig FAQs, downloaded from https://facerig_com/faq/, Mar. 2, 2017, 8 pages.
FaceRig Tips, downloaded from https://facerig_com/tips/, Mar. 14, 2017, 12 pages.
FaceRig's Indiegogo, downloaded from https:1/www.indiegogo.com/projects/facerigh#/, Mar. 14, 2017, 30 pages.

(56) References Cited

OTHER PUBLICATIONS

FaceRig on Steam, downloaded from http:1/store.steampowered.com/app/274920, Mar. 2, 2017, 5 pages.
FaceRig Steam Community, downloaded from http://steamcommunity.com/app/274920, Mar. 2, 2017, 7 pages.
FaceRig Steam Community Guides, downloaded from http://steamcommunity.com/app/274920/guides/, Mar. 2, 2017, 2 pages.
FaceRig YouTube Video channel, downloaded from http:1/www.youtube.com/facerig, Mar. 14, 2017, 2 pages.
Taiwanese Patent Office, "Office Action," issued in connection with Taiwanese Patent Application No. 102112378, dated Nov. 13, 2014, with English translation, 23 pages.
Taiwanese Office Action received for Taiwanese Patent Application No. 102112378, dated Apr. 10, 2015, with English translation, 5 pages.
International Bureau, "International Preliminary Report on Patentability and Written Opinion," received for PCT Patent Application No. PCT/CN2012/000460, dated Oct. 23, 2014, 7 pages.
International Bureau, "International Preliminary Report on Patentability and Written Opinion," received for PCT Patent Application No. PCT/CN2012/000461, dated Jul. 10, 2014, 7 pages.
United States Patent and Trademark Office, "Office Action," issued in U.S. Appl. No. 13/997,266, dated Sep. 17, 2015, 16 pages.
United States Patent and Trademark Office, "Notice of Allowance," issued in U.S. Appl. No. 13/997,266, dated Feb. 12, 2016, 5 pages.
Taiwanese Patent Office, "Search Report," issued in connection with Taiwan Application No. 102112332, dated May 24, 2016, with English translation, 2 pages.
Chinese Patent Office, "First Office Action and Search Report," issued in connection with Chinese Patent Application No. 201280071891.9 dated Jun. 4, 2015, with English translation, 19 pages.
Chinese Patent Office, "Notification of the First Office Action," issued in connection with Chinese Application No. 201180075926.1, dated Oct. 24, 2016, with English translation, 17 pages.
United States Patent and Trademark Office, "Notice of allowance," issued in U.S. Appl. No. 13/993,612, dated Apr. 15, 2016, 11 pages.
United States Patent and Trademark Office, "Final Office Action," issued in U.S. Appl. No. 13/993,612, dated Oct. 28, 2015, 13 pages.
United States Patent and Trademark Office, "Office Action," issued in U.S. Appl. No. 13/993,612, dated May 7, 2015, 16 pages.
Chinese Patent Office, "First Office Action," issued in connection with Chinese Application No. 201380076325.1, dated Nov. 6, 2017, with English translation, 22 pages.
Morishima, S. el al.: "Face-to-face communicative avatar driven by voice", in Proc. 1999 IEEE Int. Cont. Image Processing (CD-ROM), pp. 11-15, vol. 3, Oct. 24, 1999, 5 pages.
Morishima, S.: "Face Analysis and Synthesis", IEEE Signal Processing Magazine, vol. 18, No. 3, pp. 26-34, May 2001, 9 pages.
International Searching Authority, "International Search Report and Written Opinion," issued in connection with PCT Application No. PCT/CN2013/000669, dated Mar. 13, 2014, 9 pages.
International Searching Authority, "International Search Report and Written Opinion," issued in connection with PCT Application No. PCT/CN2012/081061, dated Jun. 13, 2013, 14 pages.
International Searching Authority, "International Search Report and Written Opinion," issued in connection with PCT Application No. PCT/CN2011/072603, dated Oct. 27, 2011, 11 pages.
Stargreetz, retrieved from http://corp.stargreetz.com, retrieved on Apr. 4, 2013, pp. 1-2 as printed.
Tom's Messenger—Android Apps on Google Play, retrieved from https://play_google.com/store/apps/details?id=com_t>utfit7.tomsmessengerfree, retrieved on Apr. 4, 2013, pp. 1-2 as printed.
Blanz et al., "A Statistical Method for Robust 3D Surface Reconstruction from Sparse Data", Proceedings of $2^{nd}$ International Symposium on 3D Data Processing, Visualization and Transmission, Sep. 6-9, 2004, 8 pages.
United States Patent and Trademark Office, "Non-Final Office Action," issued in connection with U.S. Appl. No. 14/127,457, dated Jun. 19, 2015, 9 pages.
United States Patent and Trademark Office, "Non-Final Office Action," issued in connection with U.S. Appl. No. 14/127,457, dated May 19, 2016, 11 pages.
United States Patent and Trademark Office, "Final Office Action," issued in connection with U.S. Appl. No. 14/127,457, dated Nov. 25, 2015, 12 pages.
United States Patent and Trademark Office, "Notice of Allowance," issued in connection with U.S. Appl. No. 14/127,457, dated Oct. 24, 2016, 5 pages.
International Bureau, "International Preliminary Report on Patentability and Written Opinion," issued in connection with PCT Application No. PCT/CN2013/000669, dated Dec. 8, 2015, 13 pages.
United States Patent and Trademark Office, "Non-Final Office Action," issued in connection with U.S. Appl. No. 15/450,295, dated Dec. 28, 2017, 7 pages.
Saragih et al., "Real-time Avatar Animation from a Single Image", In Automatic Face & Gesture Recognition and Workshops (FG 2011), 2011 IEEE International Conference, IEEE., 8 pages.
United States Patent and Trademark Office, "Final Office Action," issued in connection with U.S. Appl. No. 15/184,409, dated Jan. 25, 2018, 12 pages.
Taiwanese Office Action issued in Taiwan Application No. 106103271, dated Feb. 22, 2018, with English translation, 4 pages.
Taiwanese Office Action issued in Taiwan Application No. 106103276, dated Feb. 22, 2018, with English translation, 4 pages.
Taiwanese Patent Office, "Official Letter from the Examiner," issued in connection with Taiwanese patent application No. 109121460, dated Nov. 5, 2021, 3 pages (machine translation included).
Taiwanese Patent Office, "Office Action and Search Report," issued in connection with Taiwan Application No. 102112511, dated May 26, 2016, with English translation, 11 pages.
Taiwanese Patent Office, "Search Report," issued in connection with Taiwan Application No. 102112511, dated Mar. 15, 2017, with English translation of Search Report, 10 pages.
Taiwanese Patent Office, "Search Report," issued in connection with Taiwan Application No. 102112511, dated Dec. 27, 2017, with English translation of Search Report, 2 pages.
Chinese Patent Office, "First Office Action and Search Report," issued in connection with Chinese Application No. 201280071879.8, dated Jul. 26, 2016, with English translation, 36 pages.
Chinese Patent Office, "Second Office Action," issued in connection with Chinese Application No. 201280071879.8, dated Mar. 13, 2017, with English translation, 35 pages.
Chinese Patent Office, "Third Office Action," issued in connection with Chinese Application No. 201280071879.8, dated Jun. 16, 2017, with English translation, 38 pages.
Chinese Patent Office, "Decision on Rejection," issued in connection with Chinese Application No. 201280071879.8, dated Oct. 10, 2017, with English translation, 37 pages.
Chameides, et al., "Chemistry in the troposphere" Georgia Institute of Technology, Oct. 4, 1982, 15 pages.
Wang, et al., "Hydroxyl Radical Concentrations Measure of Ambient Air", Scientific Research Staff, Ford Motor Company, Dearborn, Michigan, May 6, 1975, 4 pages.
Chinese Patent Office, "First Office Action," issued in connection with Chinese Application No. 201280064807.0, dated Jul. 18, 2016, with English translation, 13 pages.
Chinese Patent Office, "Second Office Action," issued in connection with Chinese Application No. 201280064807.0, dated Mar. 21, 2017, with English translation, 14 pages.
Chinese Patent Office, "Notification of $2^{nd}$ Office Action," issued in connection with Chinese Application No. 201180075926.1, dated Mar. 29, 2017, with English translation, 20 pages.
International Bureau, "International Preliminary Report on Patentability and Written Opinion," issued in connection with PCT Patent Application No. PCT/CN2012/000458, dated Oct. 14, 2014, 8 pages.
International Bureau, "International Preliminary Report on Patentability and Written Opinion," issued in connection with PCT Patent Application No. PCT/CN2011/084902, dated Jul. 1, 2014, 5 pages.

(56) References Cited

OTHER PUBLICATIONS

International Bureau, "International Preliminary Report on Patentability and Written Opinion," issued in connection with PCT Patent Application No. PCT/CN2012/000459, dated Oct. 14, 2014, 6 pages.
International Bureau, "International Preliminary Report on Patentability and Written Opinion," issued in connection with PCT Patent Application No. PCT/CN2011/072603, dated Oct. 15, 2013, 7 pages.
United States Patent and Trademark Office, "Non-Final Office Action," issued in connection with U.S. Appl. No. 13/997,265, dated Jun. 29, 2015, 15 pages.
United States Patent and Trademark Office, "Final Office Action," issued in connection with U.S. Appl. No. 13/997,265, dated Feb. 5, 2016, 13 pages.
United States Patent and Trademark Office, "Non-Final Office Action," issued in connection with U.S. Appl. No. 13/997,265, dated May 24, 2016, 14 pages.
United States Patent and Trademark Office, "Final Office Action," issued in connection with U.S. Appl. No. 13/997,265, dated Sep. 22, 2016, 14 pages.
United States Patent and Trademark Office, "Non-Final Office Action," issued in connection with U.S. Appl. No. 13/997,265, dated Feb. 27, 2017, 14 pages.
United States Patent and Trademark Office, "Final Office Action," issued in connection with U.S. Appl. No. 13/997,265, dated Aug. 9, 2017, 16 pages.
United States Patent and Trademark Office, "Final Office Action," issued in connection with U.S. Appl. No. 15/395,657, dated Jul. 13, 2017, 10 pages.
United States Patent and Trademark Office, "Non-Final Office Action," issued in connection with U.S. Appl. No. 13/996,230, dated Feb. 4, 2015, 11 pages.
United States Patent and Trademark Office, "Final Office Action," issued in connection with U.S. Appl. No. 13/996,230, dated Jul. 15, 2015, 16 pages.
United States Patent and Trademark Office, "Non-Final Office Action," issued in connection with U.S. Appl. No. 13/996,230, dated Dec. 31, 2015, 15 pages.
United States Patent and Trademark Office, "Final Office Action," issued in connection with U.S. Appl. No. 13/996,230, dated Jun. 21, 2016, 18 pages.
United States Patent and Trademark Office, "Non-Final Office Action," issued in connection with U.S. Appl. No. 13/996,230, dated Oct. 3, 2016, 14 pages.
United States Patent and Trademark Office, "Final Office Action," issued in connection with U.S. Appl. No. 13/996,230, dated Feb. 10, 2017, 16 pages.
United States Patent and Trademark Office, "Non-Final Office Action," issued in connection with U.S. Appl. No. 15/184,409, dated Dec. 12, 2016, 18 pages.
United States Patent and Trademark Office, "Final Office Action," issued in connection with U.S. Appl. No. 15/184,409, dated Apr. 12, 2017, 18 pages.
United States Patent and Trademark Office, "Non-Final Office Action," issued in connection with U.S. Appl. No. 15/184,409, dated Jul. 6, 2017, 11 pages.
Chinese Patent Office, "Second Office Action," issued in connection with Chinese Application No. 201280071927.3, dated Jun. 14, 2017, with English translation, 18 pages.
Chinese Patent Office, "Third Office Action," issued in connection with Chinese Application No. 201280071927.3, dated Oct. 18, 2017, with English translation, 13 pages.
Chinese Patent Office, "Decision of Rejection," issued in connection with Chinese Application No. 201280075926.1, dated Aug. 30, 2017, with English translation, 16 pages.
United States Patent and Trademark Office, "Final Office Action," issued in connection with U.S. Appl. No. 15/395,661, dated Oct. 19, 2017, 10 pages.
Chinese Patent Office, "Decision on Rejection," issued in connection with Chinese Application No. 201280064807.0, dated Oct. 23, 2017, with English translation, 18 pages.
Taiwanese Patent Office, "Office Action and Search Report," issued in connection with Taiwan Application No. 106103271, dated Oct. 31, 2017, with English translation, 17 pages.
United States Patent and Trademark Office, "Non-Final Office Action," issued in connection with U.S. Appl. No. 15/643,984, dated Jan. 17, 2018, 17 pages.
Taiwanese Patent Office, "Office Action," issued in connection with Taiwanese Patent Application No. 102112378, dated Sep. 1, 2017, with English translation, 10 pages.
Tong et al, "Semiconductor Wafer Bonding: Science and Technology", The Electrochemical Society, Inc., 1999, 9 pages.
Taiwanese Patent Office, "Office Action and Search Report," issued in connection with Taiwan Application No. 106103276, dated Oct. 31, 2017, with English translation, 17 pages.
Chinese Reexamination Notice issued in Chinese Application No. 201710032311.X, dated May 7, 2021, 19 pages.
National Intellectual Property Administration, P.R. China, "Second Office Action," issued in connection with Application No. 201710032311.X, dated May 28, 2020, 20 pages.
International Searching Authority, "International Search Report and Written Opinion," issued in connection with application No. PCT/CN2014/094602, dated Sep. 22, 2015, 8 Pages.
International Searching Authority, "International Search Report and Written Opinion," issued in connection with application No. PCT/CN2014/094618, dated Sep. 24, 2015, 8 Pages.
International Searching Authority, "International Search Report and Written Opinion," issued in connection with application No. PCT/CN2014/094622, dated Sep. 29, 2015, 7 Pages.
Ghimire et al., "Geometric Feature-Based Facial Expression Recognition in Image Sequences Using Multi-Class AdaBoost and Support Vector Machines," Jun. 14, 2013, 21 pages.
Shenzhen Lianmeng Technology Co. Ltd., "FaceQ," Oct. 17, 2014, 1 page.
Itunes Preview Outfit 7, "Talking Tom Cat 2," May 27, 2011, 2 pages.
Cao et al. "Displaced Dynamic Expression Regression for Realtime Facial Tracking and Animation,", 10 pages.
Garrido et al., "Reconstructing Detailed Dynamic Face Geometry from Monocular Video," 2013. 3 pages.
Ruiz et al., "DoubleFlip: A Motion Gesture Delimiter for Mobile Interaction," CHI 2011 • Session: Interaction on Mobile Devices, May 7, 2011, 4 pages.
Wang et al., "Action Recognition by Dense Trajectories," IEEE Conference on Computer Vision & Pattern Recognition, Jun. 2011, Colorado Springs, United States. pp. 3169-3176, 9 pages.
Xiong et al., "Supervised Descent Method and its Applications to Face Alignment," 8 pages.
Zhang et al., "Coarse-to-Fine Auto-Encoder Networks (CFAN) for Real-Time Face Alignment," Key Lab of Intelligent Information Processing of Chinese Academy of Sciences (CAS), 16 pages.
Kim et al., "Facial Feature Extraction using PCE and Wavelet Multi-Resolution Images," Sixth IEEE International Conference on Automatic Face and Gesture Recognition, May 19, 2004, 3 pages. (Abstract Only).
U.S. Appl. No. 14/779,491, Preliminary Amendment dated Sep. 23, 2015, 7 pages.
U.S. Appl. No. 14/779,535, Preliminary Amendment dated Sep. 23, 2015, 7 pages.
United States Patent and Trademark Office, "Non-Final Office Action," issued in connection with U.S. Appl. No. 14/779,535, dated Dec. 27, 2016, 32 pages.
United States Patent and Trademark Office, "Non-Final Office Action," issued in connection with U.S. Appl. No. 14/779,491, dated Nov. 10, 2016, 22 pages.
U.S. Appl. No. 14/779,491, Response filed Feb. 8, 2017 to Non Final Office Action dated Nov. 10, 2016, 12 pags.
United States Patent and Trademark Office, "Final Office Action," issued in connection with U.S. Appl. No. 14/779,501, dated May 5, 2017, 23 pages.

(56) References Cited

OTHER PUBLICATIONS

United States Patent and Trademark Office, "Non-Final Office Action," issued in connection with U.S. Appl. No. 14/779,501, dated Dec. 9, 2016, 34 pages.
United States Patent and Trademark Office, "Notice of Allowance and Fee(s) Due," issued in connection with U.S. Appl. No. 14/779,501, dated Jul. 19, 2017, 22 pages.
United States Patent and Trademark Office, "Final Office Action," issued in connection with U.S. Appl. No. 15/822,271, dated Jul. 26, 2018, 22 pages.
United States Patent and Trademark Office, "Notice of Allowance and Fee(s) Due," issued in connection with U.S. Appl. No. 14/779,491, dated Jul. 11, 2017, 18 pages.
United States Patent and Trademark Office, "Final Office Action," issued in connection with U.S. Appl. No. 14/779,491, dated Mar. 22, 2017, 22 pages.
U.S. Appl. No. 14/779,491, Response filed Jun. 23, 2017 to Final Office Action dated Mar. 22, 2017, 11 pags.
United States Patent and Trademark Office, "Notice of Allowance and Fee(s) Due," issued in connection with U.S. Appl. No. 14/779,535, dated Jun. 15, 2017, 8 pages.
U.S. Appl. No. 14/779,535, Response filed Apr. 27, 2017 to Non Final Office Action dated Dec. 27, 2016, 12 pags.
Sucontphunt et al. "Interactive 3D Facial Expression Posing Through 2D Portrain Manipulation," Graphics Interface Conference, (2008), 177-184 pgs, 8 pages.
United States Patent and Trademark Office, "Applicant Initiated Interview Summary," issued in connection with U.S. Appl. No. 14/779,501, dated Mar. 1, 2017, 5 pages.
U.S. Appl. No. 14/779,501, Preliminary Amendment Sep. 23, 2015, 7 pages.
United States Patent and Trademark Office, "Corrected Notice of Allowability," issued in connection with U.S. Appl. No. 17/039,416, dated Oct. 27, 2021, 3 pages.
United States Patent and Trademark Office, "Notice of Allowance and Fee(s) Due," issued in connection with U.S. Appl. No. 17/039,416, dated Dec. 3, 2021, 20 pages.
United States Patent and Trademark Office, "Non Final Office Action," issued in connection with U.S. Appl. No. 16/172,664, dated Dec. 27, 2019, 19 pages.
United States Patent and Trademark Office, "Final Office Action," issued in connection with U.S. Appl. No. 16/172,664, dated Jul. 10, 2019, 21 pages.
United States Patent and Trademark Office, "Notice of Allowance and Fee(s) Due," issued in connection with U.S. Appl. No. 16/172,664, dated Apr. 8, 2020, 7 pages.
United States Patent and Trademark Office, "Non-Final Office Action," issued in connection with U.S. Appl. No. 15/184,355, dated Jun. 26, 2018, 15 pages.
Welbergen et al., "Real Time Animation of Virtual Humans: A Trade-off Between Naturalness and Control," STAR—State of The Art Report. 2009, 28 pages.
Zhang et al. "Dynamic Facial Expression Analysis and Synthesis With MPEG-4 Facial Animation Parameters," IEEE Transaction on Circuits and Systems for Video Technology, vol. 18, No. 10, Oct. 2008, 15 pages.
Badler et al., "Representing and Parameterizing Agent Behaviors", 2002 IEEE. Reprinted from Proceedings of Computer Animation 2002 (CA 2002), pp. 133-143, Jun. 2002, 13 pages.
Egges et al., "Personalised Real-Time Idle Motion Synthesis," Pacific Conference on Computer Graphics and Applications (PG 2004), Oct. 6-8, 2004, 12 pages.
European Patent Office, "Extended European Search Report," issued in connection with European patent application No. 18180580.5, dated Sep. 10, 2018, 14 pages.
European Patent Office, "Extended European Search Report," issued in connection with European patent application No. 14908703.3, dated Aug. 7, 2018, 13 pages.

United States Patent and Trademark Office, "Non-Final Office Action," issued in connection with U.S. Appl. No. 15/791,222, dated Apr. 19, 2018, 26 pages.
United States Patent and Trademark Office, "Final Office Action," issued in connection with U.S. Appl. No. 15/791,222, dated Oct. 5, 2018, 14 pages.
United States Patent and Trademark Office, "Non-Final Office Action," issued in connection with U.S. Appl. No. 15/791,222, dated Jan. 28, 2019, 13 pages.
United States Patent and Trademark Office, "Final Office Action," issued in connection with U.S. Appl. No. 15/791,222, dated May 31, 2019, 16 pages.
United States Patent and Trademark Office, "Notice of Allowance and Fee(s) Due," issued in connection with U.S. Appl. No. 15/791,222, dated Sep. 18, 2019, 5 pages.
Taiwanese Office Action issued in Taiwanese Application No. 109121460, dated Nov. 4, 2021, 1 page.
International Searching Authority, "International Search Report and Written Opinion," issued in connection with PCT application No. PCT/CN2015/085556, dated May 4, 2016, 6 pages.
International Searching Authority, "International Preliminary Report on Patentability," issued in connection with PCT application No. PCT/CN2015/085556, dated Jan. 30, 2018, 4 pages.
United States Patent and Trademark Office, "Non-Final Office Action," issued in connection with U.S. Appl. No. 15/102,200, dated Oct. 31, 2017, 13 pages.
United States Patent and Trademark Office, "Final Office Action," issued in connection with U.S. Appl. No. 15/102,200, dated Jun. 1, 2018, 12 pages.
United States Patent and Trademark Office, "Notice of Allowance and Fee(s) Due," issued in connection with U.S. Appl. No. 15/102,200, dated Aug. 29, 2018, 9 pages.
United States Patent and Trademark Office, "Non-Final Office Action," issued in connection with U.S. Appl. No. 16/241,937, dated Jun. 25, 2019, 17 pages.
United States Patent and Trademark Office, "Final Office Action," issued in connection with U.S. Appl. No. 16/241,937, dated Sep. 27, 2019, 14 pages.
United States Patent and Trademark Office, "Non-Final Office Action," issued in connection with U.S. Appl. No. 16/241,937, dated Feb. 10, 2020, 15 pages.
United States Patent and Trademark Office, "Corrected Notice of Allowability," issued in connection with U.S. Appl. No. 16/241,937, dated Jul. 27, 2020, 2 pages.
Japanese Patent Office, "Notice of Reasons for Refusal," issued in connection with Japanese patent application No. 2017-554362, dated Sep. 24, 2019, 7 pages (English Translation Included).
Japanese Patent Office, "Notice of Reasons for Refusal," issued in connection with Japanese patent application No. 2017-554362, dated Jun. 9, 2020, 7 pages (English Translation Included).
Japanese Patent Office, "Notice of Allowance," issued in connection with Japanese patent application No. 2017-554362, dated Oct. 20, 2020, 2 pages (English Translation Not Included).
European Patent Office, "Extended European Search Report," issued in connection with European patent application No. 15899301.4, dated Feb. 28, 2019, 8 pages.
European Patent Office, "Communication Pursuant to Rules 70(2) and 70a (2) EPC," issued in connection with European patent application No. 15899301.4, dated Mar. 19, 2019, 1 pages.
International Searching Authority, "International Preliminary Report on Patentability and Written Opinion," issued in connection with PCT application No. PCT/CN2014/094622, dated Jun. 27, 2017, 10 pages.
Chinese Patent Office, "First Office Action," issued in connection with Chinese patent application No. 201480083627.6, dated Jan. 19, 2020, 19 pages. (English Translation Included).
Chinese Patent Office, "Second Office Action," issued in connection with Chinese patent application No. 201480083627.6, dated Jul. 3, 2020, 5 pages. (English Translation Included).
Chinese Patent Office, "Decision on Rejection," issued in connection with Chinese patent application No. 201480083627.6, dated Mar. 2, 2021, 4 pages. (English Translation Included).

(56) References Cited

OTHER PUBLICATIONS

Chinese Patent Office, "Fourth Office Action," issued in connection with Chinese patent application No. 201480083627.6, dated Aug. 27, 2021, 7 pages. (English Translation Not Included).

United States Patent and Trademark Office, "Corrected Notice of Allowability," issued in connection with U.S. Appl. No. 16/241,937, dated Jun. 26, 2020, 2 pages.

United States Patent and Trademark Office, "Notice of Allowance and Fee(s) Due," issued in connection with U.S. Appl. No. 16/241,937, dated May 15, 2020, 10 pages.

United States Patent and Trademark Office, "Advisory Action," issued in connection with U.S. Appl. No. 16/241,937, dated Nov. 22, 2019, 2 pages.

Chinese Patent Office, "Decision of Reexamination," issue don connection with Chinese patent application No. 201710032311.X dated Sep. 9, 2021, 39 pages. (English Translation Not Included).

Taiwanese Office Action issued in Taiwanese Application No. 10520649720, dated May 26, 2016, with English translation, 14 pages.

Taiwanese Office Action issued in Taiwanese Application No. 10621111180, dated Oct. 31, 2017, with English translation, 32 pages.

Taiwanese Office Action issued in Taiwanese Application No. 10820754290, dated Aug. 8, 2019, with English translation, 41 pages.

United States Patent and Trademark Office, "Final Office Action," issued in connection with U.S. Appl. No. 15/184,355, dated Dec. 21, 2018, 14 pages.

United States Patent and Trademark Office, "Notice of Allowance and Fee(s) Due," issued in connection with U.S. Appl. No. 16/987,707, dated Sep. 20, 2021, 6 pages.

United States Patent and Trademark Office, "Non-Final Office Action," issued in connection with U.S. Appl. No. 16/987,707, dated May 27, 2021, 25 pages.

United States Patent and Trademark Office, "Final Office Action," issued in connection with U.S. Appl. No. 15/395,661, dated Nov. 2, 2018, 13 pages.

United States Patent and Trademark Office, "Final Office Action," issued in connection with U.S. Appl. No. 15/643,984, dated Jun. 27, 2018, 16 pages.

United States Patent and Trademark Office, "Notice of Allowance and Fee(s) Due," issued in connection with U.S. Appl. No. 16/987,707, dated Dec. 7, 2021, 6 pages.

United States Patent and Trademark Office, "Non-Final Office Action," issued in connection with U.S. Appl. No. 17/039,416, dated Feb. 10, 2021, 11 pages.

United States Patent and Trademark Office, "Notice of Allowance and Fee(s) Due," issued in connection with U.S. Appl. No. 17/039,416, dated Aug. 11, 2021, 6 pages.

United States Patent and Trademark Office, "Corrected Notice of Allowability," issued in connection with U.S. Appl. No. 17/039,416, dated Aug. 23, 2021, 3 pages.

\* cited by examiner

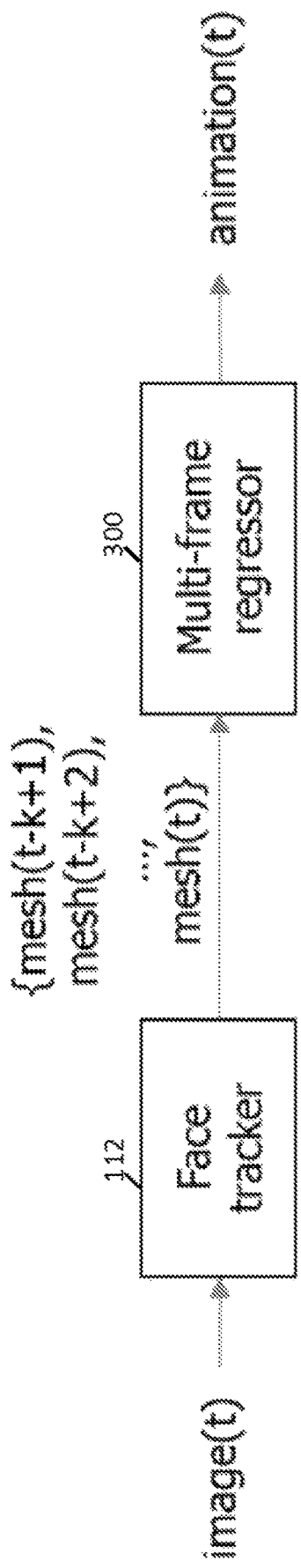
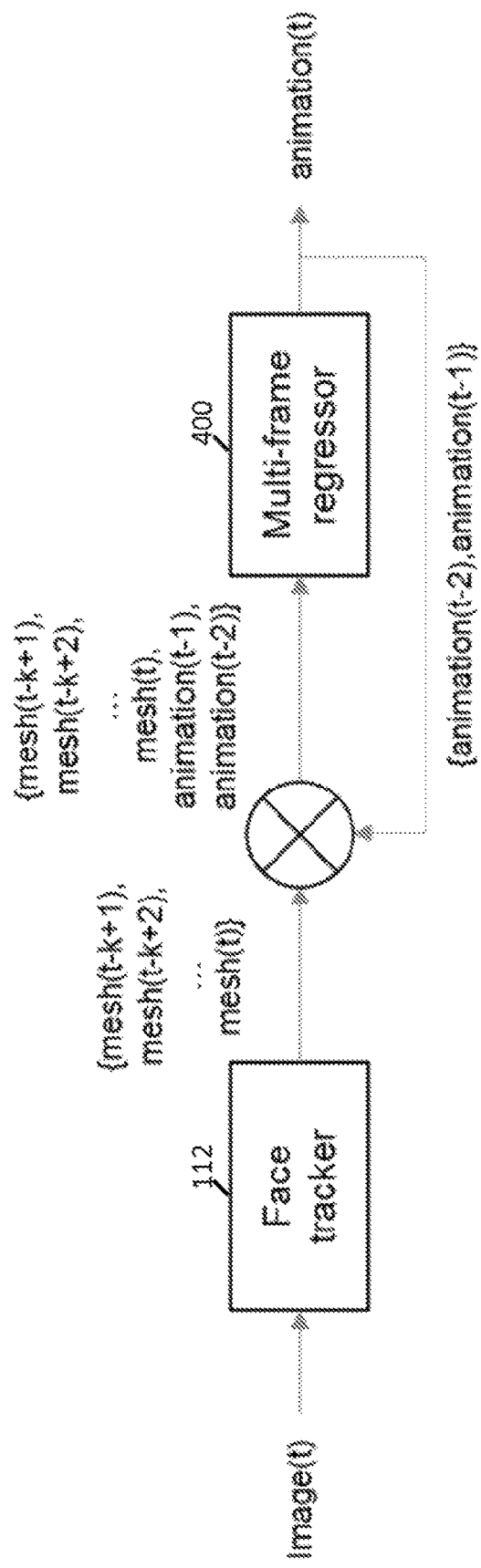
FIG. 3
FIG. 4

AVATAR ANIMATION SYSTEM

RELATED APPLICATIONS

This patent arises from a continuation and claims the benefit under 35 U.S.C. § 120 of U.S. patent application Ser. No. 15/124,811, now U.S. Pat. No. 10,475,225, titled "AVATAR ANIMATION SYSTEM", filed on Sep. 9, 2016. U.S. patent application Ser. No. 15/124,811 is a national stage application under 35 U.S.C. § 371 of International Patent Application No. PCT/CN2015/097826, filed Dec. 18, 20151. U.S. patent application Ser. No. 15/124,811 and International Patent Application No. PCT/CN2015/097826 are hereby incorporated herein by reference in their entireties. Priority to U.S. patent application Ser. No. 15/124,811 and International Patent Application No. PCT/CN2015/097826 is hereby claimed.

BACKGROUND

Computerized characters that are controlled by and represent users in a virtual environment are commonly referred to as avatars. Avatars may take a wide variety of forms. Examples of avatars include virtual humans, animals, plant life, and even certain types of food. Some computer products include avatars with facial expressions that are driven by a user's facial expressions. One example of such a product is the Pocket Avatars messaging app developed by INTEL.

Some conventional products animate an avatar by rendering a series of blend shapes. Each blend shape in a series rendered by a conventional avatar animation product defines a facial expression of the avatar and corresponds to a facial expression exhibited by the user. Avatar animation products may identify each blend shape to include in the series by analyzing an image of the user's face, identifying the user's facial expression, identifying a blend shape that corresponds to the facial expression, and generating a frame of avatar animation in which the blend shape corresponding to the facial expression is depicted. Thus, conventional avatar animation products map a user's facial expression to a blend shape in a one to one relationship and on a frame by frame basis. This approach works well where the avatar has a human face.

BRIEF DESCRIPTION OF THE DRAWINGS

FIG. 3 is an input-output diagram illustrating the operation of a face tracker and a multi-frame regressor in accordance with an embodiment of the present disclosure.

FIG. 4 is an input-output diagram illustrating the operation of a face tracker and another multi-frame regressor in accordance with an embodiment of the present disclosure.

DETAILED DESCRIPTION

Figure 1:
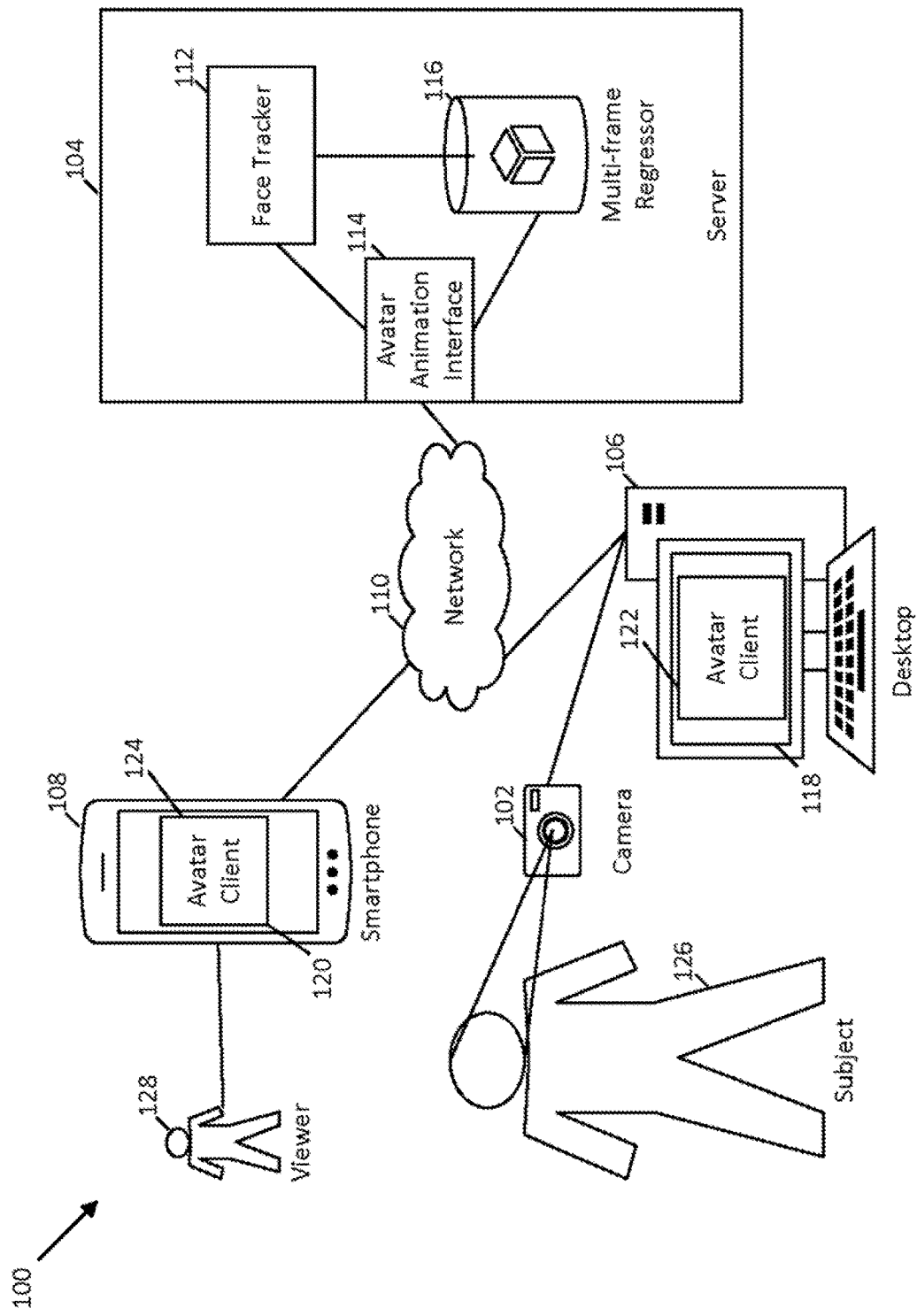
FIG. 1 is a block diagram illustrating an avatar animation system configured in accordance with an embodiment of the present disclosure.

Avatar animation systems disclosed herein provide high quality, real-time avatar animation that is based on expressions exhibited by a human face. As used herein, the phrase "high quality avatar animation" refers to, in addition its ordinary meaning, avatar animation having the qualities of avatar animation authored by professional, human animators. The provision of avatar animation that is both high quality and real-time differentiates the systems described herein from conventional avatar animation products that merely map a user's facial expression to a blend shape in a one to one relationship and on a frame by frame basis. For instance, such direct conversion or so-called mapping from a facial tracker to character animation on a frame by frame basis through blend shapes is limited in that it cannot accommodate time-domain and other characteristics that are especially desirable when animating non-human avatars. Such characteristics are discussed, for example, in the book titled *Disney Animation: The Illusion of Life* (1981). More specifically, while direct conversion techniques consider the corresponding blend shape, they fail to consider transition between blend shapes. To this end, unlike systems that employ direct mapping from the output of tracker to the target animation frame by frame through blend shapes, an embodiment of the present disclosure provides a system configured to construct as map between the aggregated output of a facial tracker (including multiple frames) to a target animation frame. Since the target animation still can be generated on a frame by frame basis, there is no delay when mapping tracker output to animation.

In some example embodiments, the real-time provision of high quality avatar animation is enabled, at least in part, by a multi-frame regressor that is programmed or otherwise configured to map information descriptive of facial expressions depicted in two or more images to information descriptive of a single avatar blend shape. This multi-frame regressor implements a machine learning component that generates the high quality avatar animation from information descriptive of a subject's face and/or information descriptive of avatar animation frames previously generated by the multi-frame regressor. The machine learning component may be trained using a set of training images that depict human facial expressions and avatar animation authored by professional human animators to reflect facial expressions depicted in the set of training images.

In some example embodiments, the multi-frame regressor in effect maps two or more temporally sequential frames depicting a subject to a single frame of avatar animation. When mapping the two or more temporally sequential frames, the multi-frame regressor operates on additional information provided by changes between the frames to generate animation that is intended to closely mimic professionally authored animation. As will be appreciated in light of this disclosure, the consideration of this additional information allows the disclosed methodology to consider transition between blend shapes. In some such example embodiments, the multi-frame regressor further incorporates, as input to tire mapping process, one or more previously generated avatar animation frames. Incorporation of the one or more previously generated avatar animation frames enables the multi-frame regressor to operate on the additional information provided by changes between the previously generated avatar animation frames. In this way, these example embodiments, adapt to and account for first and second order dynamics present in the avatar animation. Note the frames of image data depicting a plurality of facial expressions of a subject (i.e., the image frames upon which the avatar animation is at least in pan based on) need not be temporally sequential and may alternatively be two or more frames of image data, each frame effectively representing a snapshot of that subject's countenance at a given moment in time. As will be appreciated, using sequential frames allows for a more realistic real time user experience.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

As previously explained, conventional avatar animation products provide a number of benefits, but also suffer from disadvantages as well. For example, the one-to-one relationship between facial expression and blend shape present in conventional avatar animation products results in animation that transitions directly from one blend shape to the next without reflecting desirable adjustments (e.g., in the time domain) often employed by skilled animators. For example, physical movement of the face must overcome inertia both at the start and the end of a movement. For this reason, skilled animators author avatar animation with more frames at the beginning and end of a movement as this appears more realistic to the human eye. However, conventional avatar animation products fail to produce avatar animation frames that follow this principle.

Thus, and in accordance with some examples of the present disclosure, avatar animation systems are provided that are programmed or otherwise configured to generate high quality avatar animation in real-time. In some example embodiments, the avatar animation system includes a multi-frame regressor programmed or otherwise configured to map information descriptive of facial expressions depicted in two or more temporally sequential images to information descriptive of a single avatar blend shape. The information descriptive of the facial expressions may include a facial mesh having coordinates that define a plurality of landmark points on a subject's face. The information descriptive of the avatar blend shape may include a plurality of primitive blend shape weights from which an avatar blend shape (e.g., avatar facial expression) can be rendered. Primitive blend shapes are authored by an avatar's artist and each primitive blend shape corresponds to a key facial action, such as any of the facials actions defined in the facial action coding system (FACS) developed by Carl-Herman Hjortsjö. Each primitive blend shape weight specifies a degree to which a primitive blend shape corresponding to the weight should be factored into the avatar blend shape rendered.

As described further below, the multi-frame regressor may be further programmed or otherwise configured to incorporate previously generated primitive blend shape weights into the mapping process. By so doing, the multi-frame regressor adjusts subsequently generated primitive blend shape weights in view of first order and second order dynamics present in the previously generated primitive blend shape weights.

In some examples, the multi-frame regressor is incorporated into an avatar animation system that includes additional features. For instance, some examples comprise an avatar animation system that includes an avatar client component that is programmed or otherwise configured to acquire images of the subject via a camera and provide the images to an avatar animation interface. The avatar client component may also be programmed or otherwise configured to render avatar animation from sets of primitive blend shape weights received from the avatar animation interface.

In some examples, the avatar animation interface is programmed or otherwise configured to receive images acquired by avatar client components and provide the images to a face tracker. The avatar animation interface may also be programmed or otherwise configured to transmit sets of primitive blend shape weights received from the multi-frame regressor to one or more avatar client components.

In some examples, the face tracker, is programmed or otherwise configured to identify landmark points on the faces of subjects (as depicted in the images acquired by the avatar client component) and store meshes based on the landmark points that encode the facial expressions of the subjects as sets of two dimensional or three dimensional coordinates.

In some example embodiments, the multi-frame regressor is programmed or otherwise configured to retrieve a set of meshes generated by the face tracker and provide the set of meshes to a machine learning component. The machine learning component is configured to map the set of meshes to a set of primitive blend shape weights that represent an avatar blend shape to be rendered in a single frame of avatar animation. In some example embodiments, the multi-frame regressor is programmed or otherwise configured to provide the set of primitive blend shape weights to the avatar animation interface for distribution to rendering components, as described further above.

The avatar animation system described herein may be incorporated into a wide variety of applications and systems. For example, the avatar animation system may be incorporated into a messaging application or other social media applications. In the context of these applications, the avatar animation system provides users with a robust form of nonverbal communication while allowing the user to remain anonymous.

Avatar Animation System

FIG. 1 illustrates an avatar animation system 100 in accordance with some embodiments. As shown, the avatar animation system 100 is configured to generate and provide real-time, high quality avatar animation based on facial expressions of a subject 126. The avatar animation system 100 includes a camera 102, a server computer 104, a desktop computer 106, a smart phone 108, and a network 110. The camera 102 is coupled to the desktop computer 106 and may be physically integrated therein or distinct therefrom. Each of the server computer 104, the desktop computer 106, and the smart phone 108, may be any of a variety of programmable devices, such as any of the programmable devices described below with reference to FIGS. 7 and 8. The desktop computer 106 and the smartphone 108 respectively include displays 118 and 120, each of which may display high quality avatar animation to the subject 126 and/or a viewer 128. The desktop computer 106 and the smartphone 108 also respectively include avatar client components 122 and 124, each of which communicates with the avatar animation interface 114 to request, receive, and display the high quality avatar animation. The server computer 104 includes a face tracker 112, an avatar animation interface 114, and a multi-frame regressor 116, which are described further below. The communication network 110 may include any communication network through which programmable devices may exchange information. For example, the network 110 may be a public network, such as the Internet, and may include other public or private networks such as LANs, WANs, extranets and intranets. As shown in FIG. 1, the server computer 104, the desktop computer 106, and the smart phone 108 are connected to and communicate data via the network 110.

As shown in FIG. 1, the server computer 104 includes the face tracker 112, the avatar animation interface 114, and the multi-frame regressor 116. The avatar animation interface 114 is configured to receive image data from one or more avatar clients (e.g., the avatar client 122 and/or the avatar client 124) via the network 110, provide this image data to the face tracker 112 for processing, receive avatar animation data from the multi-frame regressor 116, and transmit the avatar animation data to the one or more avatar clients via the network 110. The face tracker 112 is configured to analyze image data to identify landmark points indicative of the facial expressions of the subject and store a facial mesh based on the identified landmark points. Landmark points are a collection of points in an image that specify the identity and orientation of facial features such as lips, eyebrows, eye lids, etc. In some examples, the face tracker 112 stores the facial mesh as one or more pairs of x, y coordinates or as one or more triplets of x, y, and z coordinates. The multi-frame regressor 116 is configured to receive two or more facial meshes generated by the face tracker 112 and generate a frame of avatar animation based on the two or more facial meshes. Examples of the face tracker 112 and the multi-frame regressor 116 are described further below with reference to FIGS. 3 and 4.

Figure 2:
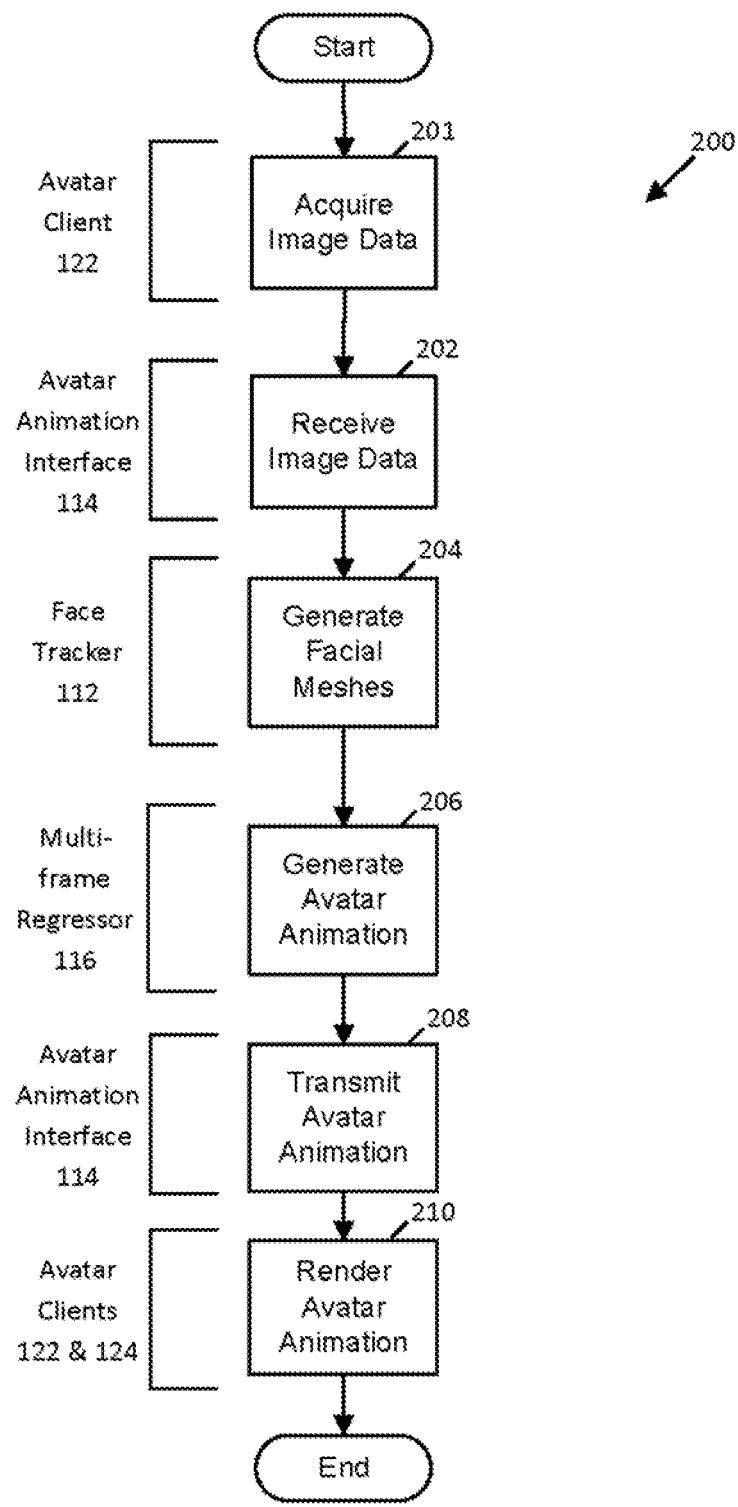
FIG. 2 is a flow diagram illustrating an avatar animation process configured in accordance with an embodiment of the present disclosure.

FIG. 2 illustrates an example avatar animation process 200 executed by the avatar animation system 100 in accord with some embodiments. The avatar animation process 200 begins in act 201 with a camera (e.g., the camera 102) acquiring two or more images of a human subject (e.g., the subject 126). These images may include images of the subject's face. The camera digitizes each of the images and provides the digitized images to an avatar client component (e.g., the avatar client 122) executed by a programmable device (e.g., the desktop computer 106). The avatar client component, in turn, transmits the digitized images via a network (e.g., the network 110) to an avatar host component (e.g., the avatar animation interface 114) executed by a host device (e.g., the server computer 104). In some examples, the avatar client component encodes the digitized images into one or more requests for animation prior to transmitting the digitized images to the avatar host component. These one or more animation requests may include an identifier of the avatar client component.

In act 202, in response to receiving the one or more animation requests, the avatar host component parses the one or more animation requests and passes the digitized images stored within the one or more animation requests to a face tracker (e.g., the face tracker 112). In act 204, the face tracker identifies landmark points and generates a facial mesh representing the facial expression depicted in each of the two or more images and passes the generated facial meshes to a multi-frame regressor (e.g., the multi-frame regressor 116). In act 206, the multi-frame regressor receives the facial meshes and maps groups of facial meshes having a predefined number of member meshes (e.g., two or more meshes) to individual avatar animation frames and provides the avatar animation frames to the avatar host component.

In act 208, the avatar host component transmits the avatar animation frames to one or more avatar client components (e.g., the avatar client component 112 and/or the avatar client component 124). In some examples, the avatar host component transmits avatar animation frames within one or more messages that are responsive to the one or more animation requests received in the act 202. In act 210, the one or more avatar client components receive the avatar animation frames and render the avatar animation frames on a display (e.g., the display 118 and/or the display 120).

Processes in accord with the avatar animation process 200 enable avatar animation systems to provide avatar animation derived from facial expressions of subjects in real-time.

FIG. 3 is in input-output diagram that illustrates the operation of the face tracker 112 and one example of the multi-frame regressor 116, a multi-frame regressor 300. As illustrated in FIG. 3, the face tracker 112 receives a new inbound image, image(t), that includes an image of a human face acquired at time t. The face tracker 112 may receive this image from an avatar animation interface (e.g., the avatar animation interface 114). In one example, the face tracker 112 next identifies 78 landmark points that, in combination, indicate the facial expression of the subject. In some examples, the face tracker executes Intel® RealSense™ technology to identify these landmark points within the inbound image of the human face. Next, the face tracker 112 generates a new mesh, illustrated in FIG. 3 as mesh(t), and stores the mesh(t) in a data store, such as may be locally available on the server 104. In the example illustrated in FIG. 4, the face tracker 112 stores the mesh(t) in a data store that includes a set of some number of previously generated and stored meshes (e.g., {mesh(t−k+1), mesh(t−k+2), ... mesh(t)}). The cardinality of the set stored in this manner may vary between examples. For instance, in any of several examples, the set of stored meshes has a cardinality of between 5 and 10 meshes.

The multi-frame regressor 300 may be implemented using any of a variety of machine learning techniques. For instance, the multi-frame regressor 300 may be a support vector machine, a random forest, an artificial neural network, or the like. In some examples, the multi-frame regressor 300 retrieves the set of meshes (or a subset thereof) from the data store and maps the set (or subset) to a single frame of avatar animation. In the example illustrated in FIG. 3, the multi-frame regressor 300 retrieves the set of meshes consisting of {mesh(t−k+1), mesh(t−k+2), . . . mesh(t)} and generates a single frame of avatar animation, animation(t) that corresponds to the image(t). In some examples, the animation(t) includes a set of primitive blend shape weights, as described above). Next, the multi-frame regressor 300 provides this frame of avatar animation to the avatar animation interface for subsequent processing, which may include bundling the frame with other avatar animation frames for subsequent transmission in a packet to one or more avatar clients and/or streaming the frame to one or more avatar clients.

FIG. 4 is an input-output diagram that illustrates the operation of the face tracker 112 and another example of the multi-frame regressor 116, a multi-frame regressor 400. The face tracker 112 of FIG. 4 operates in the same manner as the face tracker 112 of FIG. 3. Like the multi-frame regressor 300, the multi-frame regressor 400 may be implemented using any of a variety of machine learning techniques. For instance, the multi-frame regressor 400 may be a support vector machine, a random forest, an artificial neural network, or the like. In some examples, the multi-frame regressor 400 operates in a similar manner to the multi-frame regressor 300 in that the multi-frame regressor 400 retrieves the set of meshes (or a subset thereof) from the data store. However, the multi-frame regressor 400 also retrieves one or more previous avatar animation frames and maps the set (or subset) of meshes in conjunction with the one or more previous avatar animation frames to a single frame of avatar animation. In the example illustrated in FIG. 4, the multi-frame regressor 400 retrieves the set of meshes consisting of {mesh(t−k+1), mesh(t−k+2), . . . mesh(t)} and a set of previous animation frames {animation(t−1), animation(t−2)} and generates a single frame of avatar animation, animation(t) that corresponds to the image(t). In some examples, the animation(t) includes a set of primitive blend shape weights, as described above). Next, the multi-frame regressor 400, like the multi-frame regressor 300, provides this frame of avatar animation to the avatar animation interface for subsequent processing.

Figure 5:
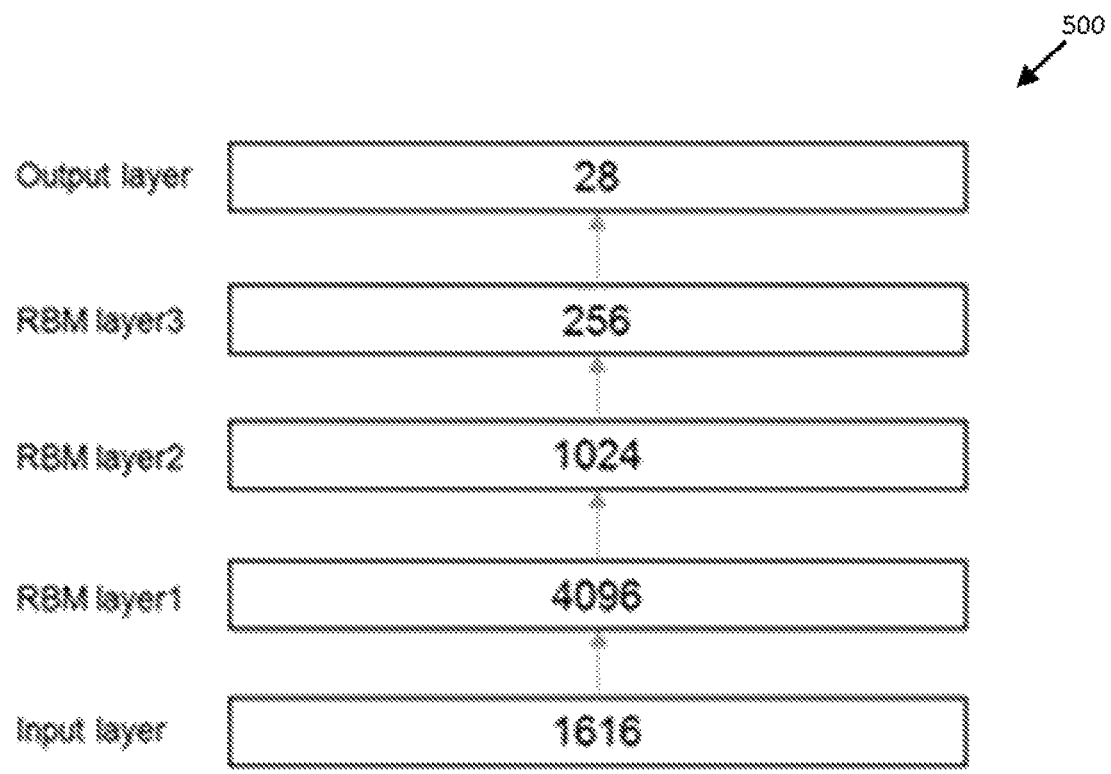
FIG. 5 is a schematic of an artificial neural network implemented by a multi-frame regressor in accordance with an embodiment of the present disclosure.

FIG. 5 illustrates one example of a machine learning technique implemented within the multi-frame regressor 400, an artificial neural network 500, in accordance with some embodiments. As shown, the artificial neural network 500 is an RBM (Restricted Boltzmann Machine) that includes an input layer, an RBM layer 1, RBM layer 2, an RBM layer 3, and an output layer. In the illustrated example, the input layer includes 1616 nodes. Each of the 1616 nodes corresponds to either a weight of a primitive blend shape within one of the previous avatar animation frames (i.e., 28 primitive blend shape weights×2 avatar animation frames=56 input values) or a coordinate value of a vertex within one of the set of meshes (i.e., 78 vertexes×2 coordinate values×10 images=1560 input values). Also in this example, each of the nodes in the input layer is full connected to all of the nodes in the RBM layer 1. Each of the nodes in the RBM layer 1 is connected to all of the nodes in the RBM layer 2. Each of the nodes in the RBM layer 2 is connected to all of the nodes in the RBM layer 3. Each of the nodes in the RBM layer 3 is connected to all of the nodes in the output layer. In some examples, the multi-frame regressor 400 provides input values to each of the nodes in the input layer and receives from the output layer a single frame of avatar animation in the form of 28 primitive blend shapes weights to apply to the face of the avatar. As described above, these 28 primitive blend shapes weights may be used by an avatar client to render a frame of high quality avatar animation in real-time.

The example illustrated in FIG. 5 is designed to map two dimensional meshes to primitive blend shape weights. In other examples, of the multi-frame regressor 400, the machine learning technique may be adapted to map three dimensional meshes to primitive blend shape weights. Thus, the embodiments disclosed herein are not limited to two dimensional or three dimensional meshes.

In some examples, the components disclosed herein (e.g., the avatar clients 122 and 124; the avatar animation interface 114, the face tracker 112 and the multi-frame regressor 116) may read parameters that affect the operations performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). Further, some examples provide for both system and user interfaces that allow external entities to modify the parameters and thereby configure the behavior of the components.

Information within the avatar animation system may be stored in any logical and physical construction capable of holding information on a computer readable medium including, among other structures, linked lists, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Information may flow between the components disclosed herein using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Example System

Figure 6:
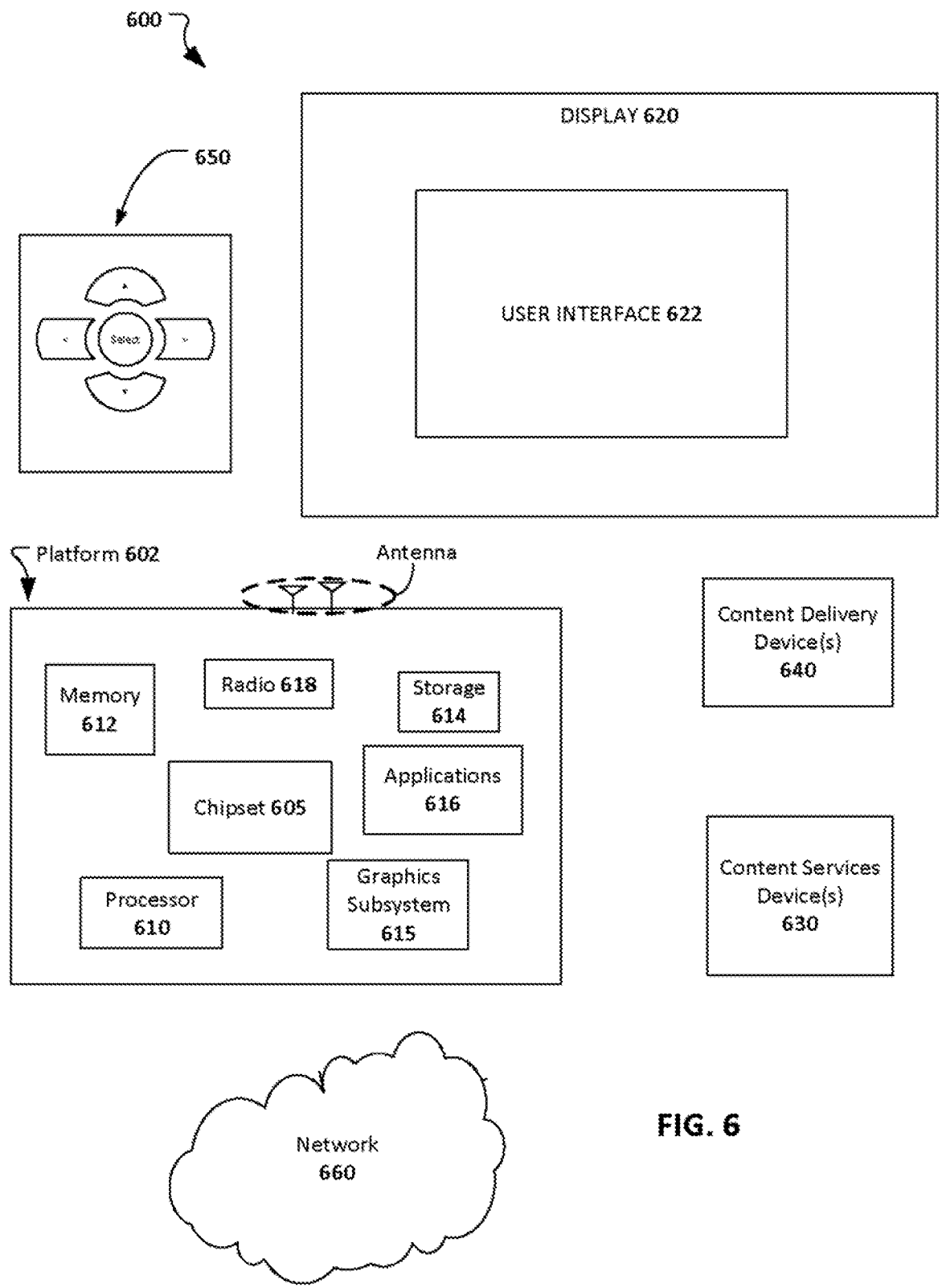
FIG. 6 illustrates a computing system configured in accordance with an embodiment of the present disclosure.

FIG. 6 illustrates a computing system 600 configured in accordance with an embodiment of the present disclosure. In some embodiments, system 600 may be a computing system configured to provide high quality avatar animation although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart Television), mobile interact device (MID), messaging device, data communication device, set-top box, game console, or other such computing environments capable of performing graphics rendering operations and displaying content.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-cone processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques, including direct view projection techniques described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

Figure 7:
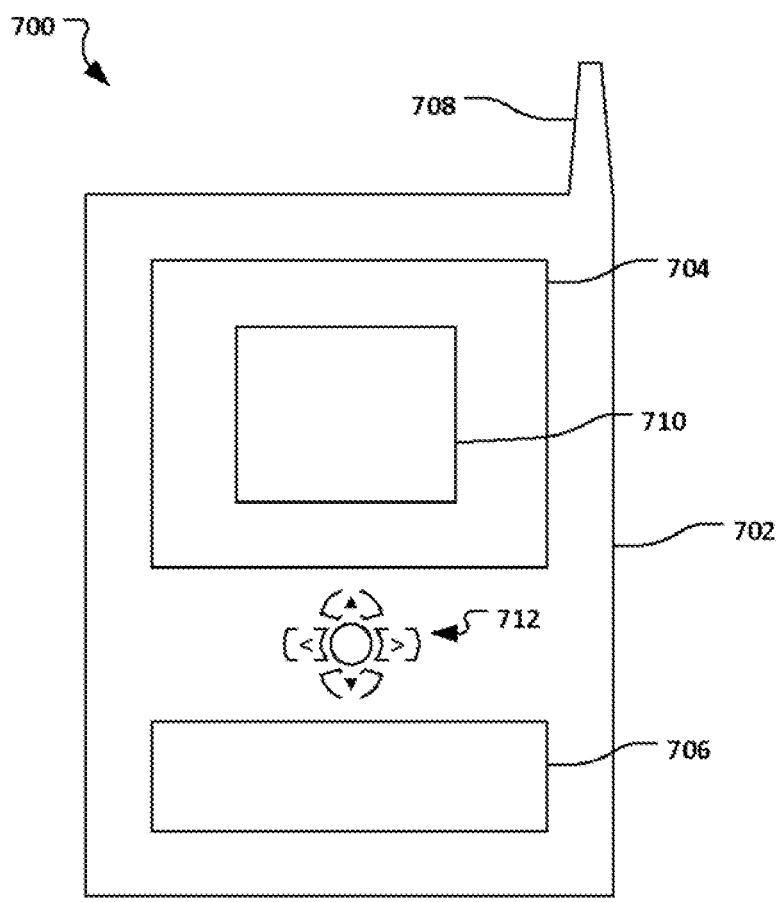
FIG. 7 illustrates a mobile computing system configured in accordance with an embodiment of the present disclosure.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, Chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is an avatar animation system comprising a memory and at least one processor coupled to the memory and configured to receive image data depicting a plurality of facial expressions of a subject; map input data including data descriptive of the plurality of facial expressions to output data descriptive of a single avatar expression; and provide the output data to a user interface component.

Example 2 includes the subject matter of Example 1, wherein the image data includes at least one of two-dimensional image data and three-dimensional image data.

Example 3 includes the subject matter of either Example 1 or Example 2, wherein the input data includes previously identified output data.

Example 4 includes the subject matter of any of the preceding Examples, wherein the data descriptive of the plurality of facial expressions includes coordinates of landmark points within each facial expression of the plurality of facial expressions.

Example 5 includes the subject matter of any of the preceding Examples, wherein the output data includes blend shape weights.

Example 6 includes the subject matter of any of the preceding Examples, further comprising an avatar client component including the user interface component and configured to acquire the image data and render the single avatar expression via the user interface component.

Example 7 includes the subject matter of any of Example 6, wherein the avatar client component is executable by the at least one processor.

Example 8 includes the subject matter of either Example 6 or Example 7, wherein the avatar client component is executable by a programmable device that includes one or more processors other than the at least one processor.

Example 9 includes the subject matter of any of the preceding Examples, wherein the at least one processor is configured to map the input data using a machine learning component.

Example 10 includes the subject matter of Example 9, wherein the machine learning component includes an artificial neural network.

Example 11 includes the subject matter of Example 10, wherein the artificial neural network is configured to process the input data via a plurality of input nodes; and generate the output data via a plurality of output nodes.

Example 12 includes the subject matter of Example 11, wherein each input node of the plurality of input nodes is configured to receive either a coordinate value or a blend shape weight.

Example 13 includes the subject matter of either Example 11 or Example 12, wherein each output node of the plurality of output nodes is configured to identify a blend shape weight.

Example 14 is a method of generating avatar animation using a system, the method comprising receiving image data depicting a plurality facial expressions of a subject; mapping input data including data descriptive of the plurality of facial expressions to output data descriptive of a single avatar expression; and providing the output data to a user interface component.

Example 15 includes the subject matter of Example 14, wherein receiving the image data includes receiving at least one of two-dimensional image data and three-dimensional image data.

Example 16 includes the subject matter of either Example 14 or Example 15, wherein mapping the input data includes mapping previously identified output data.

Example 17 includes the subject matter of any of Examples 14 through 16, wherein mapping input data including the data descriptive of the plurality of facial expressions includes mapping input data including coordinates of landmark points within each facial expression of the plurality of facial expressions.

Example 18 includes the subject matter of any of Examples 14 through 17, wherein mapping input data including the data descriptive of the plurality of facial expressions to the output data includes mapping input data including the data descriptive of the plurality of facial expressions to blend shape weights.

Example 19 includes the subject matter of any of Examples 14 through 18, further comprising acquiring the image data; and rendering the single avatar expression via the user interface component.

Example 20 includes the subject matter of Example 19, wherein the system includes a first device and a second device, receiving the image data includes receiving the image data at the first device, acquiring the image data includes acquiring the image data at the second device, and the method further comprises transmitting the image data from the second device to the first device.

Example 21 includes the subject matter of any of Examples 14 through 20, wherein mapping the input data includes executing a machine learning component.

Example 22 includes the subject matter of Example 21, wherein executing the machine learning component includes implementing an artificial neural network.

Example 23 includes the subject matter of Example 22, wherein the artificial neural network includes a plurality of input nodes and a plurality of output nodes and the method further comprises processing the input data via the plurality of input nodes and generating the output data via the plurality of output nodes.

Example 24 includes the subject matter of Example 23, further comprising receiving, at each input node of the plurality of input nodes, either a coordinate value or a blend shape weight.

Example 25 includes the subject matter of either Example 23 or Example 24, further comprising identifying, at each output node of the plurality of output nodes, a blend shape weight.

Example 26 is a non-transient computer program product encoded with instructions that when executed by one or more processors cause a process of animating avatars to be carried out, the process comprising receiving image data depicting a plurality facial expressions of a subject; mapping input data including data descriptive of the plurality of facial expressions to output data descriptive of a single avatar expression; and providing the output data to a user interface component.

Example 27 includes the subject matter of Example 26, wherein receiving the image data includes receiving at least one of two-dimensional image data and three-dimensional image data.

Example 28 includes the subject matter of either Example 26 or Example 27, wherein mapping the input data includes mapping previously identified output data.

Example 29 includes the subject matter of any of Examples 26 through 28, wherein mapping input data including the data descriptive of the plurality of facial expressions includes mapping input data including coordinates of landmark points within each facial expression of the plurality of facial expressions.

Example 30 includes the subject matter of any of Examples 26 through 29, wherein mapping input data including the data descriptive of the plurality of facial expressions to the output data includes mapping input data including the data descriptive of the plurality of facial expressions to blend shape weights.

Example 31 includes the subject matter of any of Examples 26 through 30, the process further comprising acquiring the image data and rendering the single avatar expression via the user interface component.

Example 32 includes the subject matter of Example 31, wherein the system includes a first device and a second device, receiving the image data includes receiving the image data at the first device, acquiring the image data includes acquiring the image data at the second device, and the method further comprises transmitting the image data from the second device to the first device.

Example 33 includes the subject matter of any of Examples 26 through 32, wherein mapping the input data includes executing a machine learning component.

Example 34 includes the subject matter of Example 33, wherein executing the machine learning component includes implementing an artificial neural network.

Example 35 includes the subject matter of Example 34, wherein the artificial neural network includes a plurality of input nodes and a plurality of output nodes and the method further comprises processing the input data via the plurality of input nodes; and generating the output data via the plurality of output nodes.

Example 36 includes the subject matter of Example 35, the process further comprising receiving, at each input node of the plurality of input nodes, either a coordinate value or a blend shape weight.

Example 37 includes the subject matter of either Example 35 or Example 36, the process further comprising identifying, at each output node of the plurality of output nodes, a blend shape weight.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An avatar animation system comprising:
    a display;
    a camera; and
    at least one processor communicatively coupled to the display and the camera, the at least one processor being configured to:
    generate a plurality of meshes based on a plurality of images of a face of a subject generated by the camera, respective ones of the plurality of meshes corresponding to respective ones of the plurality of images of the face of the subject, the plurality of meshes including:
        a first set of meshes, respective ones of the first set of meshes corresponding to respective ones of a first set of the images of the face of the subject, and
        a second set of meshes, respective ones of the second set of meshes corresponding to respective ones of a second set of the images of the face of the subject,
        wherein the first set of meshes is not identical to the second set of meshes, and an entirety of at least one mesh from the plurality of meshes is included in both the first set of meshes and the second set of meshes;
    generate a first set of blend shape weights for a first frame of avatar animation, the first set of blend shape weights based on the first set of meshes;
    generate a second set of blend shape weights for a second frame of avatar animation, the second frame of avatar animation being different from the first frame of avatar animation, and the second set of blend shape weights being based on at least:
        the second set of meshes and the first set of blend shape weights;
    generate the second frame of avatar animation based on the second set of blend shape weights; and
    cause the display to present the second frame of avatar animation.

2. The avatar animation system of claim 1, further including memory, the memory, the display, the camera, and the at least one processor housed within a smart phone.

3. The avatar animation system of claim 2, wherein the at least one processor is further configured to cause the second frame of avatar animation to be presented within a messaging application.

4. The avatar animation system of claim 1, wherein the at least one processor is further configured to:
    identify a plurality of sets of landmark points within the plurality of images of the face of the subject, respective ones of the sets of landmark points corresponding to respective ones of the images of the face of the subject; and generate respective ones of the plurality of meshes based on the corresponding set of landmark points.

5. The avatar animation system of claim 1, wherein the at least one processor is further configured to generate the second set of blend shape weights by executing an artificial neural network including a plurality of input nodes and a plurality of output nodes.

6. The avatar animation system of claim 5, wherein corresponding ones of the input nodes are to receive either (a) a corresponding coordinate value associated with one of the plurality of meshes or (b) a corresponding blend shape weight of the first set of blend shape weights.

7. The avatar animation system of claim 6, wherein respective ones of the output nodes are to identify a corresponding blend shape weight of the second set of blend shape weights.

8. The avatar animation system of claim 1, wherein respective ones of the plurality of images of the face of the subject include at least one of two-dimensional image data or three-dimensional image data.

9. The avatar animation system of claim 1, wherein the at least one processor is further configured to generate the second set of blend shape weights by adjusting the second set of blend shape weights based on the first set of blend shape weights.

10. The avatar animation system of claim 1, wherein the at least one processor is further configured to generate a mapping between the first frame of avatar animation and one or more of the plurality of meshes.

11. A method comprising:
generating a plurality of meshes based on a plurality of images of a face of a subject, respective ones of the plurality of meshes corresponding to respective ones of the plurality of images of the face of the subject, the plurality of meshes including:
   a first set of meshes, respective ones of the first set of meshes corresponding to respective ones of a first set of the images of the face of the subject, and
   a second set of meshes, respective ones of the second set of meshes corresponding to respective ones of a second set of the images of the face of the subject,
   wherein the first set of meshes is not identical to the second set of meshes, and an entirety of at least one mesh from the plurality of meshes is included in both the first set of meshes and the second set of meshes;
generating a first set of blend shape weights for a first frame of avatar animation using feedback, the first set of blend shape weights based on the first set of meshes;
generating a second set of blend shape weights for a second frame of avatar animation, the second frame of avatar animation being different from the first frame of avatar animation, and the second set of blend shape weights being based on at least:
   the second set of meshes and the first set of blend shape weights; and
generating the second frame of avatar animation based on the second set of blend shape weights.

12. The method of claim 11, wherein the generating of the second set of blend shape weights includes executing an artificial neural network including a plurality of input nodes and a plurality of output nodes, and further including, receiving at corresponding ones of the input nodes, either (a) a corresponding coordinate value associated with one of the plurality of meshes or (b) a corresponding blend shape weight of the first set of blend shape weights.

13. The method of claim 12, wherein the generating of the second set of blend shape weights includes identifying, at respective ones of the output nodes, a corresponding blend shape weight.

14. The method of claim 11, further including causing the second frame of avatar animation to be presented via a messaging application.

15. The method of claim 11, further including:
identifying a plurality of sets of landmark points within the plurality of images of the face of the subject, respective ones of the sets of landmark points corresponding to respective ones of the plurality of images of the face of the subject; and
generating respective ones of the plurality of meshes based on the corresponding set of landmark points.

16. At least one storage device comprising instructions that, when executed, cause one or more processors to:
generate a plurality of meshes based on a plurality of images of a face of a subject, respective ones of the plurality of meshes corresponding to respective ones of the plurality of images of the face of the subject, the plurality of meshes including:
   a first set of meshes, respective ones of the first set of meshes corresponding to respective ones of a first set of the images of the face of the subject, and
   a second set of meshes, respective ones of the second set of meshes corresponding to respective ones of a second set of the images of the face of the subject,
   wherein the first set of meshes is not identical to the second set of meshes, and an entirety of at least one mesh from the plurality of meshes is included in both the first set of meshes and the second set of meshes;
generate a first set of blend shape weights for a first frame of avatar animation, the first set of blend shape weights based on the first set of meshes;
generate a second set of blend shape weights for a second frame of avatar animation, the second frame of avatar animation being different from the first frame of avatar animation, and the second set of blend shape weights being based on at least:
   the second set of meshes and the first set of blend shape weights; and
generate the second frame of avatar animation based on the second set of blend shape weights.

17. The at least one storage device of claim 16, wherein the instructions, when executed, cause the one or more processors to cause the second frame of avatar animation to be presented via a messaging application.

18. The at least one storage device of claim 16, wherein the instructions, when executed, cause the one or more processors to:
identify landmark points in respective ones of the plurality of images of the face of the subject; and
generate respective ones of the plurality of meshes based on the landmark points.

19. The at least one storage device of claim 16, wherein the instructions, when executed, cause the one or more processors to generate the second set of blend shape weights by adjusting the second set of blend shape weights based on the first set of blend shape weights.

* * * * *